United States Patent
Kim et al.

(10) Patent No.: US 9,916,635 B2
(45) Date of Patent: Mar. 13, 2018

(54) TRANSPARENT DISPLAY DEVICE AND CONTROL METHOD THEREOF

(71) Applicant: SAMSUNG ELECTRONICS CO., LTD., Suwon-si (KR)

(72) Inventors: Sung-hyun Kim, Yongin-si (KR); Sang-young Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 56 days.

(21) Appl. No.: 14/747,520

(22) Filed: Jun. 23, 2015

(65) Prior Publication Data
US 2016/0035138 A1 Feb. 4, 2016

(30) Foreign Application Priority Data
Jul. 31, 2014 (KR) ......................... 10-2014-0098464

(51) Int. Cl.
*G09G 5/00* (2006.01)
*G06T 1/20* (2006.01)
*H04N 5/265* (2006.01)
*G06F 3/01* (2006.01)
*G09G 3/00* (2006.01)

(52) U.S. Cl.
CPC ................ *G06T 1/20* (2013.01); *G06F 3/011* (2013.01); *G09G 3/00* (2013.01); *H04N 5/265* (2013.01)

(58) Field of Classification Search
None
See application file for complete search history.

(56) References Cited

U.S. PATENT DOCUMENTS

| | | | |
|---|---|---|---|
| 2008/0120561 A1* | 5/2008 | Woods | A63F 13/12 715/764 |
| 2012/0040612 A1* | 2/2012 | Lee | B60R 16/0234 455/41.1 |
| 2012/0105487 A1* | 5/2012 | Son | G06F 3/0487 345/671 |
| 2012/0182445 A1* | 7/2012 | You | H04N 1/00411 348/231.2 |
| 2012/0256823 A1* | 10/2012 | Lee | G06F 3/011 345/156 |
| 2013/0194167 A1 | 8/2013 | Yun et al. | |
| 2013/0271474 A1* | 10/2013 | Apodaca | G09G 3/001 345/501 |

(Continued)

FOREIGN PATENT DOCUMENTS

| JP | 2013156635 A | 8/2013 |
|---|---|---|
| KR | 1020120104471 A | 9/2012 |

(Continued)

*Primary Examiner* — Martin Mushambo
(74) *Attorney, Agent, or Firm* — Sughrue Mion, PLLC

(57) ABSTRACT

A transparent display device is provided, which includes: a transparent display; a camera; a graphic processor configured to generate an augmented reality (AR) object; and a controller configured to operate in at least one of a transparent AR mode in which the AR object is displayed on the transparent display and a video AR mode in which the AR object is displayed on an image captured by the camera. The controller is further configured to switch between the transparent AR mode and the video AR mode in response to an occurrence of a predetermined event.

20 Claims, 28 Drawing Sheets

(56) References Cited

U.S. PATENT DOCUMENTS

| | | | |
|---|---|---|---|
| 2013/0342696 A1* | 12/2013 | Cai | H04N 7/18 348/148 |
| 2014/0019005 A1* | 1/2014 | Lee | G08G 1/0962 701/36 |
| 2014/0063064 A1* | 3/2014 | Seo | G08G 1/166 345/633 |
| 2014/0104316 A1 | 4/2014 | Sharma et al. | |

FOREIGN PATENT DOCUMENTS

| | | |
|---|---|---|
| KR | 1020140003107 A | 1/2014 |
| KR | 1020140031466 A | 3/2014 |

\* cited by examiner

FIG. 1A
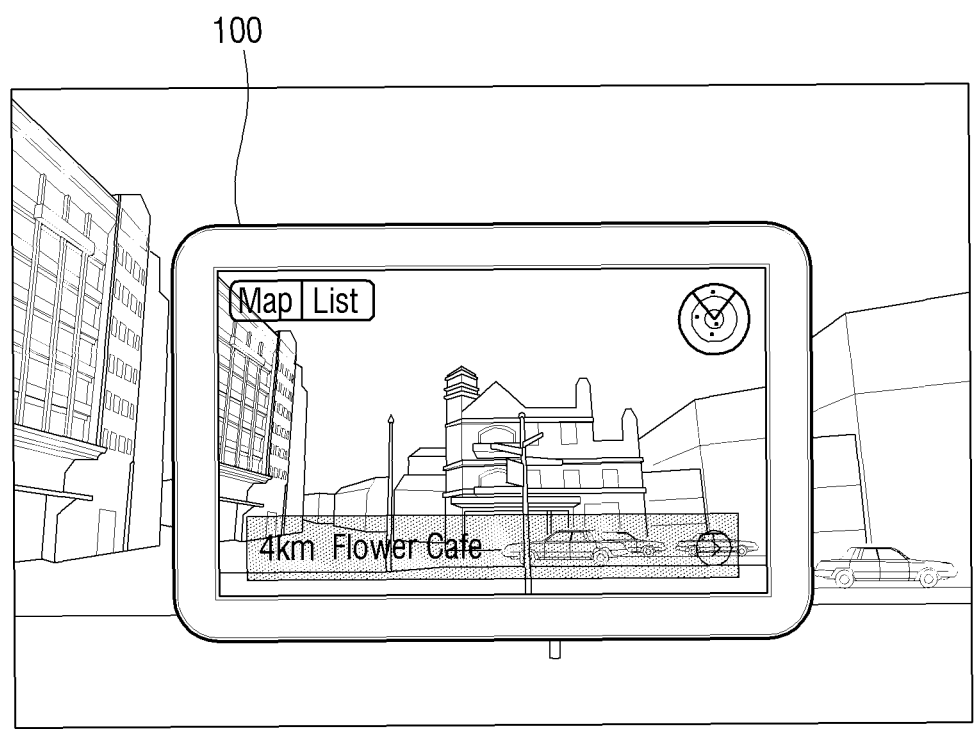
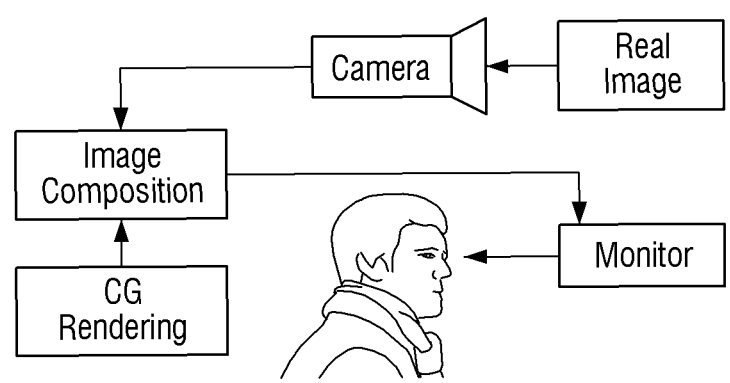

FIG. 1B
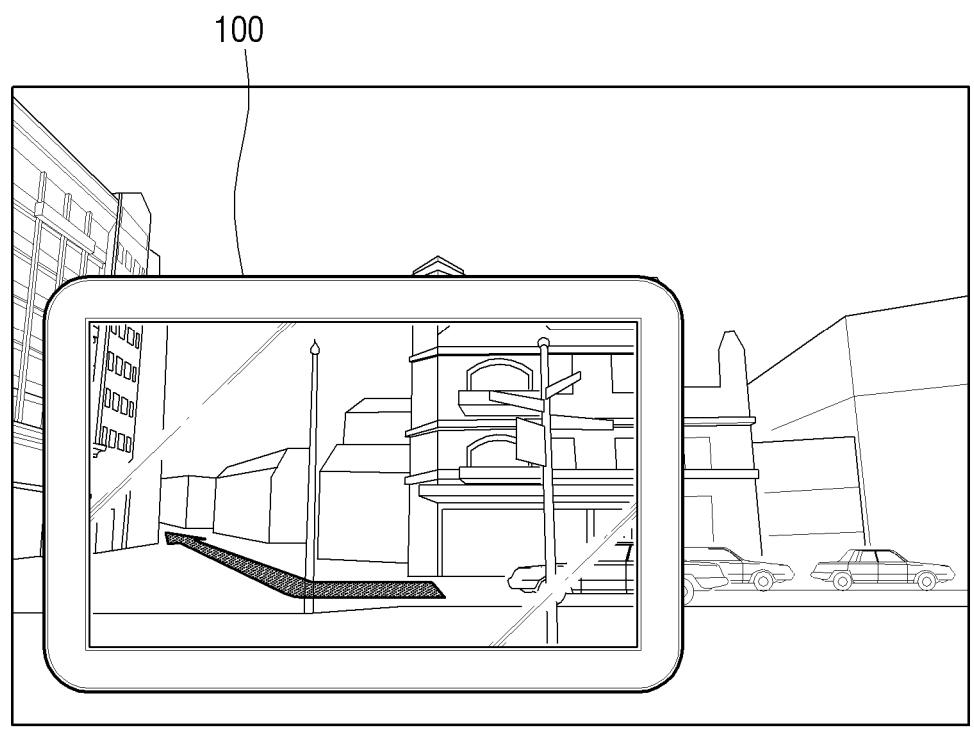
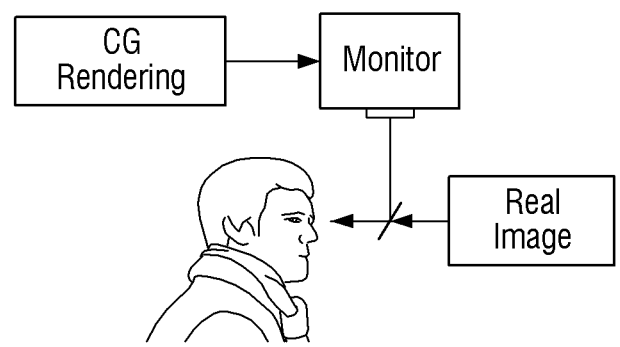

FIG. 15C
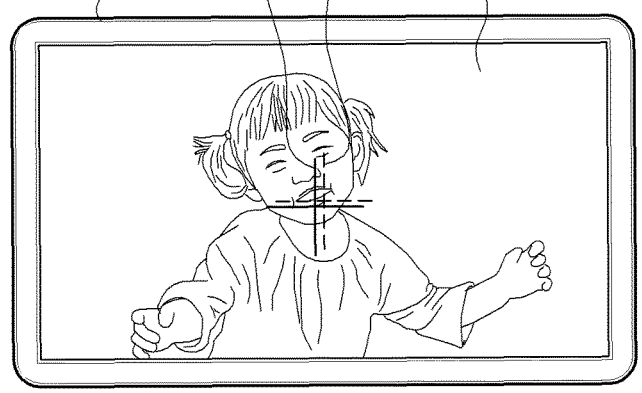
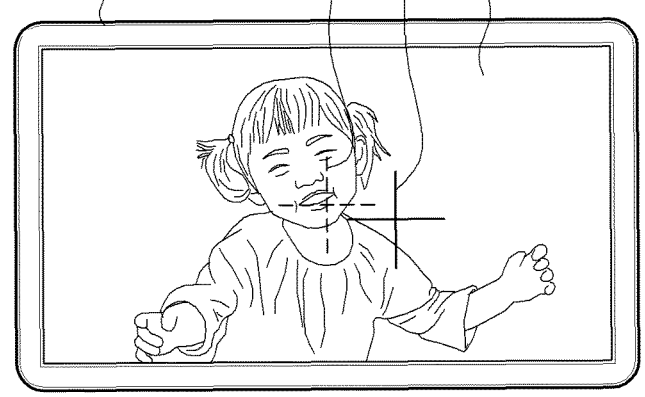

FIG. 16A
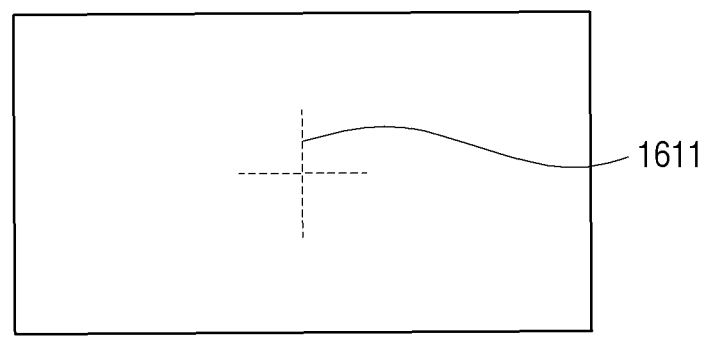
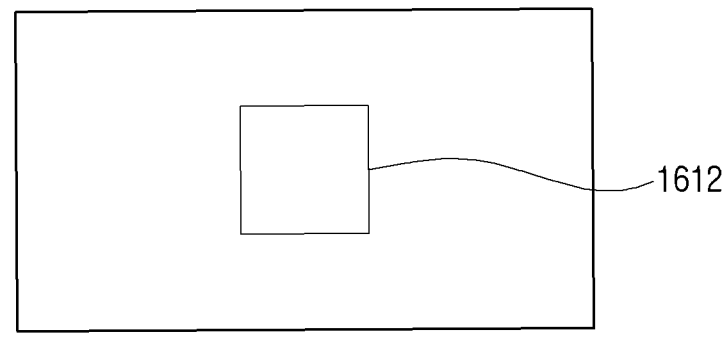
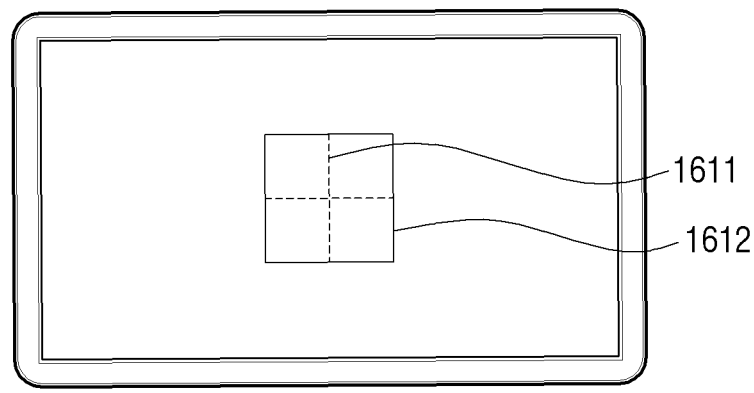

FIG. 17B
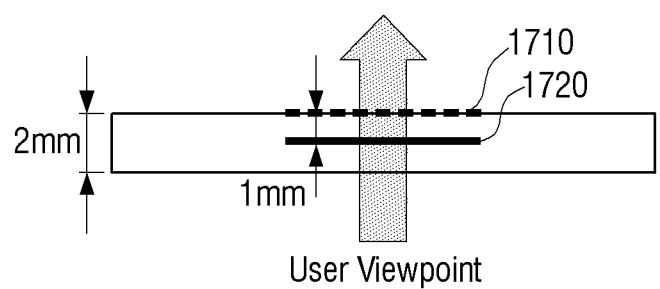
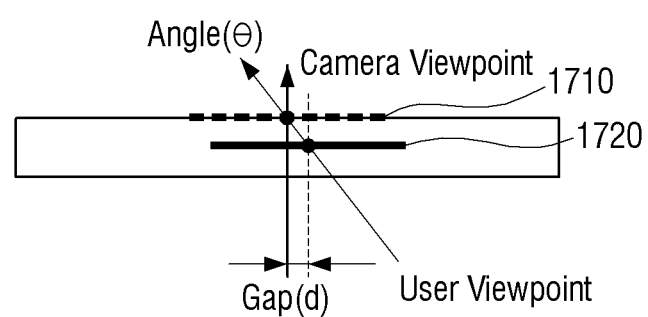

FIG. 17C

| d(um) | Θ(°) | d(um) | Θ(°) |
|---|---|---|---|
| 200 | 11.3 | 5200 | 79.1 |
| 400 | 21.8 | 5400 | 79.5 |
| 600 | 31.0 | 5600 | 79.9 |
| 800 | 38.7 | 5800 | 80.2 |
| 1000 | 45.0 | 6000 | 80.5 |
| 1200 | 50.2 | 6200 | 80.8 |
| 1400 | 54.5 | 6400 | 81.1 |
| 1600 | 58.0 | 6600 | 81.4 |
| 1800 | 60.9 | 6800 | 81.6 |
| 2000 | 63.4 | 7000 | 81.9 |
| 2200 | 65.6 | 7200 | 82.1 |
| 2400 | 67.4 | 7400 | 82.3 |
| 2600 | 69.0 | 7600 | 82.5 |
| 2800 | 70.3 | 7800 | 82.7 |
| 3000 | 71.6 | 8000 | 82.8 |
| 3200 | 72.6 | 8200 | 83.0 |
| 3400 | 73.6 | 8400 | 83.2 |
| 3600 | 74.5 | 8600 | 83.3 |
| 3800 | 75.3 | 8800 | 83.5 |
| 4000 | 76.0 | 9000 | 83.6 |
| 4200 | 76.6 | 9200 | 83.7 |
| 4400 | 77.2 | 9400 | 83.8 |
| 4600 | 77.7 | 9600 | 84.0 |
| 4800 | 78.2 | 9800 | 84.1 |
| 5000 | 78.7 | 10000 | 84.2 |

TRANSPARENT DISPLAY DEVICE AND CONTROL METHOD THEREOF

CROSS-REFERENCE TO THE RELATED APPLICATION

This application claims priority from Korean Patent Application No. 10-2014-0098464 filed on Jul. 31, 2014 in the Korean Intellectual Property Office, the disclosure of which is incorporated herein in its entirety by reference.

BACKGROUND

1. Field

Apparatuses and methods consistent with exemplary embodiments relate to a transparent display device and a control method thereof, and more particularly to a transparent display device that provides an augmented reality (AR) function and a control method thereof.

2. Description of the Related Art

With the development of electronic technology, various types of display devices have been used in various fields. In particular, research studies for next-generation display devices, such as transparent display devices, have been accelerated.

A transparent display device refers to a device which has transparency so that a background of the device, that is, a scene behind the device is seen through the device. In the related art, a display panel is manufactured using a semi-transparent semiconductor compound, such as silicon (Si) or gallium arsenide (GaAs). As various application fields, which the display panel in the related art is incapable of implementing, become in demand, efforts have been put into the development of new electronic display devices. The transparent display device may be one that is developed under such efforts.

The transparent display device is implemented to include a transparent oxide semiconductor film which has transparency. In the case of using the transparent display device, a user can see necessary information through a screen of the transparent display device while seeing the background positioned at the rear of the device. Accordingly, spatial and temporal limitations of the display devices in the related art can be addressed.

For example, augmented reality (AR) that is purported to display information about an object which is position behind a device has been used for various purposes.

As described above, due to the transparent property thereof, the transparent display device has many advantages over the existing display device, but also has a problem that is caused by the transparent property thereof. For example, due to the transparent property thereof, according to use environments, information on the screen may not be seen well.

Accordingly, there has been a need for technology that makes it possible to use the transparent display device more effectively and in various manners.

SUMMARY

Various exemplary embodiments are provided to address at least the above problem or needs by disclosing a transparent display device and a display method thereof, which can automatically switch over to an appropriate AR mode according to use environments of the transparent display device.

According to one aspect of an exemplary embodiment, there is provided a transparent display device which may include: a transparent display; a camera; a graphic processor configured to generate an AR object; and a controller configured to operate in at least one of a transparent AR mode in which the AR object is displayed on the transparent display and a video AR mode in which the AR object is displayed on an image captured by the camera. The controller may be further configured to switch between the transparent AR mode and the video AR mode in response to an occurrence of a predetermined event.

The transparent display device may further include a sensor configured to sense a distance between the transparent display device and an object, wherein the controller switches from one of the transparent AR mode and the video AR mode to the other AR mode in response to an occurrence of an event in which the distance sensed by the sensor satisfies a predetermined condition.

The transparent display device may further include a sensor configured to sense background information about the transparent display device, wherein the controller switches from one of the transparent AR mode and the video AR mode to the other AR mode in response to an occurrence of an event in which at least one of illumination information and viewing environment information sensed by the sensor satisfies a predetermined condition.

The transparent display device may further include a sensor configured to sense a battery residual amount of the transparent display device, wherein the controller switches from one of the transparent AR mode and the video AR mode to the other AR mode in response to an occurrence of an event in which the battery residual amount sensed by the sensor satisfies a predetermined condition.

The controller may control the transparent display to display a screen of the video AR mode by gradually reducing transparency of the transparent display in response to a mode switching event which occurs while the controller operates in the transparent AR mode.

The controller may control the transparent display to display an AR mode to be switched as a main screen and a current AR mode on one region of the transparent display as an auxiliary screen in accordance with a mode switching event.

The controller may control the transparent display to make a screen of an AR mode to be switched and a screen of a current AR mode overlap each other to be displayed.

The controller may control the transparent display to divide a screen into first and second screens, to display a screen of an AR mode to be switched on the first screen and a screen of a current AR mode on the second screen in accordance with a mode switching event.

The transparent display device may further include a gaze recognizer configured to recognize a user's gaze, wherein the controller control the transparent display to display the AR object on a region that has a little probability of escaping from the user's gaze on the basis of the recognized user's gaze.

The transparent display device may further include a guider provided on the transparent display, wherein the controller control the transparent display to display a guide graphic user interface (GUI) having a shape that is mapped on the guider so that a user's viewpoint coincides with an image capturing viewpoint of the camera.

The controller may control the transparent display to display the image captured by the camera on the transparent display in the form of an edge image so that an image that is penetratingly seen by a user through the transparent display coincides with the image captured by the camera.

According to an aspect of another exemplary embodiment, there is provided a method for controlling a transparent display device having a transparent display and a camera. The method may include: controlling the device to operate in one of a transparent augmented reality (AR) mode in which an AR object is displayed on the transparent display and a video AR mode in which the AR object is displayed on an image captured by the camera; and controlling the device to switch between the transparent AR mode and the video AR mode in response to an occurrence of a predetermined event.

The method may further include controlling the device to sense a distance between the transparent display device and an object, wherein the controlling the device to switch comprises controlling the device to switch from one of the transparent AR mode and the video AR mode to the other AR mode in response to an occurrence of an event in which the sensed distance satisfies a predetermined condition.

The method may further include controlling the device to sense at least one of illumination information and viewing environment information, wherein the controlling the device to switch comprises controlling the device to switch from one of the transparent AR mode and the video AR mode to the other AR mode in response to an occurrence of an event in which at least one of the sensed illumination information and the sensed viewing environment information satisfies a predetermined condition.

The method may further include controlling the device to sense a battery residual amount of the device, wherein the controlling the device to switch comprises controlling the device to switch from one of the transparent AR mode and the video AR mode to the other AR mode in response to an occurrence of an event in which the sensed battery residual amount satisfies a predetermined condition.

The controlling the device to switch may include controlling the transparent display to display a screen according to the video AR mode by gradually reducing transparency of the transparent display in response to a mode switching event which occurs during an operation in the transparent AR mode.

The controlling the device to switch may include controlling the transparent display to display an AR mode to be switched as a main screen and a current AR mode on one region of the transparent display as an auxiliary screen, or to divide a screen into first and second screens, to display the AR mode to be switched on the first screen, and to display the current AR mode on the second screen, in accordance with a mode switching event.

The controlling the device to switch may include controlling the transparent display to make a screen according to an AR mode to be switched and a screen according to a current AR mode overlap each other to be displayed.

The controlling the device to switch may include controlling the transparent display to divide a screen into first and second screens, to display an AR mode to be switched on the first screen, and to display a current AR mode on the second screen, in accordance with a mode switching event.

The transparent display device may further include a guider provided on the transparent display, and the method may further include displaying a guide graphic user interface (GUI) having a shape that is mapped on the guider so that a user's viewpoint coincides with an image capturing viewpoint of the camera.

The method may further include controlling the transparent display to display the image captured by the camera on the transparent display in the form of an edge image so that an image that is penetratingly seen by a user through the transparent display coincides with the image captured by the camera.

As described above, according to various exemplary embodiments of the inventive concept, the AR function that is provided in the transparent display device can be provided more efficiently.

BRIEF DESCRIPTION OF THE DRAWINGS

The above and other aspects, features and advantages of the exemplary embodiments will be more apparent from the following detailed description when taken in conjunction with the accompanying drawings, in which:

FIGS. 1A to 1C are views for explaining an operation of a transparent display device, according to exemplary embodiments;

FIGS. 15A to 15C are views explaining a guide function of the transparent display device 100, according to an exemplary embodiment;

FIGS. 16A to 16D are views illustrating various shapes of a guider and a guide GUI of a transparent display device in reference to FIGS. 2 and 4, according to exemplary embodiments;

FIGS. 17A to 17C are diagrams explaining a guide GUI control method, according to exemplary embodiments;

DETAILED DESCRIPTION OF THE EXEMPLARY EMBODIMENTS

Hereinafter, exemplary embodiments of the inventive concept will be described in detail with reference to the accompanying drawings.

Figure 1C:
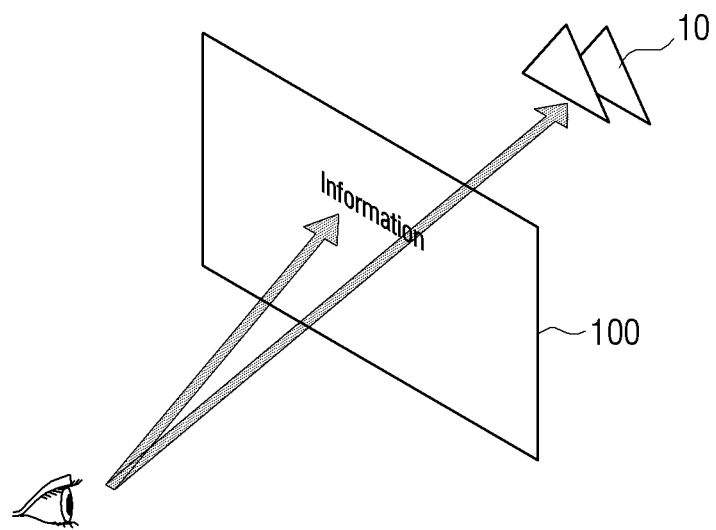

FIGS. 1A to 1C are views for explaining an operation of a transparent display device, according to exemplary embodiments.

As illustrated in FIGS. 1A and 1B, a transparent display device 100 according to an exemplary embodiment may be a portable terminal, and may be implemented in various types, such as a portable phone, a smartphone, a personal media player (PMP), a personal digital assistant (PDA), and a notebook computer.

FIG. 1A is to explain a video augmented reality (AR) mode, according to an exemplary embodiment. In the video AR mode, the transparent display device 100 displays an AR object (or AR information) over another image captured by a camera which may be the transparent display device itself. In this case, the AR object may be provided on the transparent display device 100 in various types. That is, the AR object may be rendered together with the captured image to be displayed, may be displayed over the captured image in the form of an on-screen device (OSD), or may be displayed on a layer that is different from a layer on which the captured image is displayed.

FIG. 1B is to explain a transparent AR mode, according to an exemplary embodiment. In the transparent AR mode, the transparent display device 100 displays an AR object in a state where an object that is positioned in the rear of the transparent display device 100 is transparently seen through the transparent display device 100. Particularly, in the transparent AR mode, an AR object can be displayed in a state where a background positioned at the rear the transparent display device 100 is transparently seen through a transparent display. In this case, information that is displayed on the transparent display device 100 may be information related to an object included in the background.

The transparent display device 100 may be configured such that it does not display a captured image of an object that is positioned in the rear of the transparent display device 100, but may provide information related to this object on the basis of the captured image of the object. That is, a region of interest is seen through a transparent screen of the transparent display device 100 with a user's naked eye and AR object is provided on the screen, so that a more natural screen can be provided.

FIG. 1C is a view explaining an operation related to the transparent AR mode illustrated in FIG. 1B, according to an exemplary embodiment.

In general, the human eye is unable to recognize both information displayed on the transparent display device 100 and an object disposed beyond the transparent display device 100 at the same time. The human eye focuses on an object at a long distance or at a short distance to obtain accurate vision by changing of the shape of the crystalline lens of the eye, and the human being tends to pay attention to a stimulus that arouses interest or a specific object as selective attention to a matter of main concern and to disregard others.

That is, a human visual system is constructed to selectively concentrate attention on a specific object that is relatively notable or preferential in a given environment through an unconscious action or a conscious action. Accordingly, in order to simultaneously see an object disposed beyond a screen of the transparent display device 100 and AR object displayed on the screen, it is required that the object is disposed within a predetermined distance from the back of the transparent display device 100.

Specifically, as illustrated in FIG. 1C, a user can alternately see a region of concern 10 and the AR object on the screen.

Accordingly, in the transparent AR mode, if the distance between the region behind the screen and the screen is far, it becomes very difficult to simultaneously recognize the information by the naked eye, visual fatigue is increased, and concentration is deteriorated.

Further, in the transparent AR mode, the absorption degree of the screen is degraded depending on the viewing environment, such as peripheral illumination. The respective AR modes are greatly affected by the viewing environment. For example, in the video AR mode, the display screen may not be seen well in an environment in which sunlight is glaring, while in the transparent AR mode, in the case of entering from a bright place into a dark place, the eye may temporarily become unable to recognize information displayed on the screen.

Accordingly, the exemplary embodiments provide novel schemes for appropriately switching between the video AR mode and the transparent AR mode in accordance with the use environment of the transparent display device 100 or for appropriately arranging the screen of the transparent display device 100 in accordance with the corresponding mode.

Figure 2:
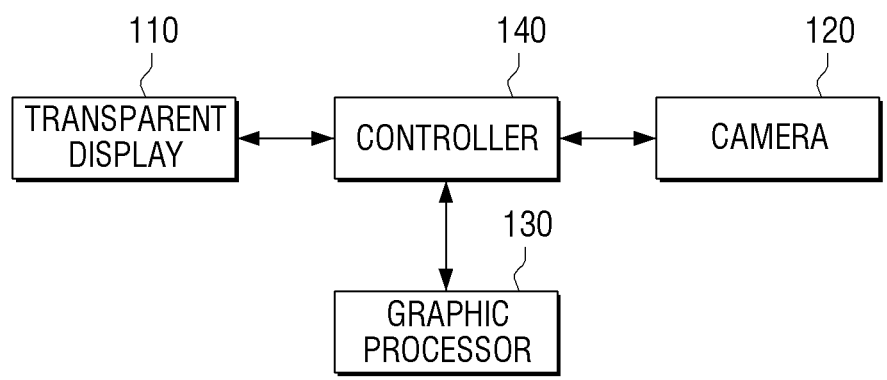
FIG. 2 is a block diagram illustrating a configuration of a transparent display device, according to an exemplary embodiment.

FIG. 2 is a block diagram illustrating a configuration of a transparent display device, according to an exemplary embodiment. Referring to FIG. 2, a transparent display device 100 includes a transparent display 110, a camera 120, a graphic processor 130, and a controller 140.

The transparent display 110 is formed of a transparent material, and displays information on its screen. Here, the displayed information may be an image, a text, etc. not being limited thereto. This information may be displayed in the form of a content reproduction screen, an application execution screen, a web browser screen, and various kinds of graphic object screen.

According to exemplary embodiments, the transparent display 110 may be implemented in various types, such as a transparent liquid crystal display (LCD) type, a transparent organic light emitting diode (OLED) type, a transparent thin film electroluminescent panel (TFEL) type, and a projection type. Hereinafter, the structure of the transparent display 110 according to various embodiments will be described.

The transparent LCD type means a transparent display device which is obtained by removing a backlight unit from an LCD device and is implemented using a pair of polarizing plates, an optical film, a transparent thin film transistor, and a transparent electrode. In the transparent LCD device, since permeability is lowered due to the polarizing plates or the optical film and peripheral light is used instead of the backlight unit, light efficiency is lowered, but it becomes possible to implement a large-area transparent display. The transparent TFEL type means a device that uses an AC type inorganic thin film EL display (AC-TFEL) that is composed of a transparent electrode, an inorganic phosphor, and an insulating layer. The AC-TFEL is a display that emits light in a manner that accelerated electrons pass through the inside of the inorganic phosphor to excite the phosphor. In the case where the transparent display 130 is implemented in the form of a transparent TFEL, the controller 130 may determine an information display position through controlling of the electrons to be projected onto an appropriate position. Since the inorganic phosphor and the insulating layer have the transparent characteristics, a very transparent display can be implemented.

In addition, the transparent OLED type means a transparent display device using a self-luminous OLED. Since an organic light emitting layer is transparent, a transparent display device can be implemented through the use of transparent electrodes as the both-side electrodes. The OLED emits light in a manner that electrons and holes are injected from both sides of the organic light emitting layer and the injected electrons and holes are combined with each other in the organic light emitting layer. The transparent OLED device displays information through injection of the electrons and the holes into desired positions using the principle as described above.

Figure 3:
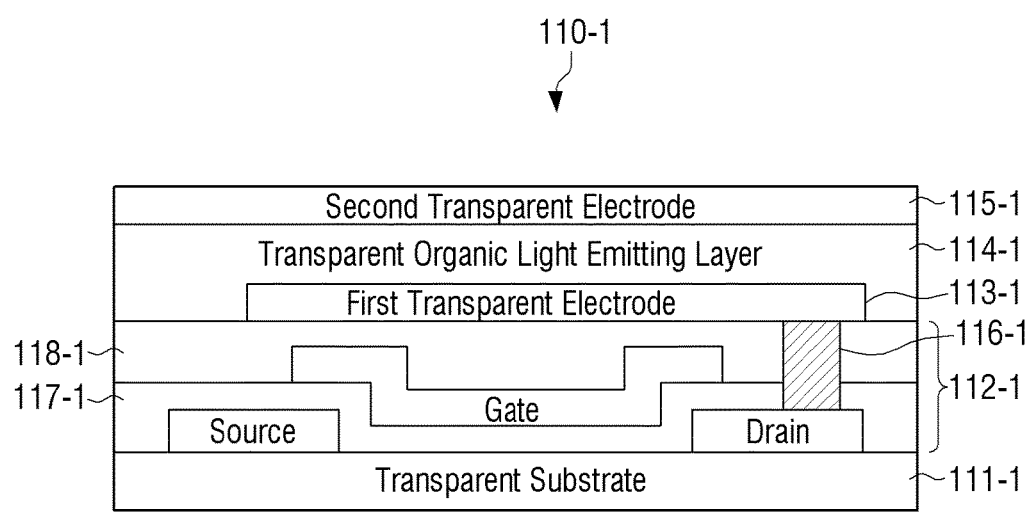
FIG. 3 is a view illustrating a detailed configuration of a transparent display implemented in a transparent OLED type, according to an exemplary embodiment.

FIG. 3 is a view illustrating a detailed configuration of a transparent display implemented in a transparent OLED type, according to an exemplary embodiment. For convenience in explanation, a transparent display that is implemented in the transparent OLED type is denoted by a reference numeral 110-1.

Referring to FIG. 3, a transparent display 110 includes a transparent substrate 111-1, a transparent transistor layer 112-1, a first transparent electrode 113-1, a transparent organic light emitting layer 114-1, a second transparent electrode 115-1, and a connection electrode 116-1.

The transparent substrate 111-1 may be formed of a polymer material, such as plastic, having a transparent property or glass. The material of the transparent substrate 111-1 may be determined depending on the use environment in which the transparent display device 100 is used. For example, the polymer material is light and flexible, and thus may be used in a portable display device, while the glass may be used in a show window of a store or a general window.

The transparent transistor layer 112-1 means a layer that includes a transistor that is produced through replacement of opaque silicon of the existing thin film transistor with a transparent material, such as transparent zinc oxide or titanium oxide. In the transparent transistor layer 112-1, a source, a gate, a drain, and various kinds of dielectric layers 117-1 and 118-1 are provided, and the connection electrode 116-1 that electrically connects the drain and the first transparent electrode 113-1 to each other may be provided. Although FIG. 3 illustrates only one transparent transistor that includes the source, the gate, and the drain in the transparent transistor layer 112-1, a plurality of transparent transistors may be actually provided in the entire region of the surface of the display. The controller 130 may apply a control signal to the gate of each transistor so as to drive the corresponding transparent transistor to display information.

The first transparent electrode 113-1 and the second transparent electrode 115-1 are arranged in opposite directions with respect to the transparent organic light emitting layer 114-1. The first transparent electrode 113-1, the transparent organic light emitting layer 114-1, and the second transparent electrode 115-1 constitute a transparent organic light emitting diode.

The transparent organic light emitting diode is briefly classified into a passive matrix OLED and an active matrix OLED according to the driving type thereof. The PMOLED has a structure in which a portion where the first and second transparent electrodes 113-1 and 115-1 cross each other forms a pixel. In contrast, the AMOLED has a structure in which a thin film transistor TFT is provided to drive each pixel. FIG. 3 illustrates the active matrix OLED.

Each of the first transparent electrode 113-1 and the second transparent electrode 115-1 includes a plurality of line electrodes which are aligned perpendicular to each other, and a plurality of cross regions are formed between the first transparent electrode 113-1 and the second transparent electrode 115-1. As illustrated in FIG. 3, a transparent transistor is connected to each cross region.

The controller 130 makes an electric potential difference be formed for each cross region using the transparent transistor. In the cross region in which the electric potential difference is formed, electrons and holes, which flow from the respective electrodes to the transparent organic light emitting layer 114-1, are combined to emit light. In contrast, in the cross region in which the electric potential different is not formed, light emission is not performed, and thus a rear background of the transparent display device 100 may be seen on a screen thereof.

On the other hand, as described above, the transparent display 110 may be implemented in the projection type in addition to the transparent LCD type, the transparent TFEL type, and the transparent OLED type. The projection type means a type in which an image is projected onto a transparent screen to be displayed thereon.

Referring again to FIG. 2, the camera 120 may generate a rear background image through capturing of an image of a rear background using an image pickup device, such as an image sensor.

The graphic processor 130 generates various objects, such as icons, images, and texts using an operator (not illustrated) and a renderer (not illustrated) under the control of the controller 140.

In particular, the graphic processor 130 may generate an AR object that is displayed on the transparent display 110 in at least one of the video AR mode and the transparent AR mode as described above.

Specifically, the operator (not illustrated) operates attribute values, such as coordinate values, shapes, sizes, and colors of the objects to be displayed according to a layout of the screen. The renderer (not illustrated) generates the AR object or various layout screens including the AR object on the basis of the attribute values operated by the operator (not illustrated). The AR object or the screen including the AR object that is generated by the renderer (not illustrated) is displayed in a screen, that is, a display region of the transparent display 110.

The controller 140 controls the overall operation of the transparent display device 100.

In particular, the controller 140 operates in one mode of the transparent AR mode in which the AR object is displayed on the transparent display 110, and the video AR mode in which the AR object is displayed on an image captured by the camera 120, and switches over to another AR mode if a predetermined event occurs.

Here, the predetermined event may be at least one of an event in which a distance to an object satisfies a predetermined condition, an event in which at least one of illumination information and viewing environment information satisfies a predetermined condition, an event in which a battery residual amount satisfies a predetermined condition, and an event in which a phone call or a message is received, not being limited thereto.

For example, as described above with reference to FIG. 1C, in order to simultaneously see an object disposed behind the transparent display device 100, which is penetratingly seen through the transparent display 110, and the AR object that is displayed on the transparent display 110 in the transparent AR mode, it is required that the object is disposed within a predetermined distance from the transparent display device 100. Accordingly, if an event occurs, in which the distance between the object and the transparent display device 100 becomes equal to or larger than a predetermined threshold distance, the mode switches over to the video AR mode.

Further, in the case of entering from a place where peripheral illumination is bright into a dark place in the transparent AR mode, the eye may temporarily become unable to recognize display of the transparent display device 100. Accordingly, if an event occurs, in which the peripheral illumination becomes equal to or lower than the predetermined threshold value, the mode switches over to the video AR mode.

Further, in the video AR mode, an image should be displayed, and thus battery consumption becomes greater than that in the transparent AR mode. Accordingly, if an event occurs, in which the battery residual amount becomes equal to or smaller than a predetermined threshold value, the mode switches over to the transparent AR mode.

Further, if an event occurs, in which a phone call or a message is received at the transparent display device 100 in the transparent AR mode, the mode switches over to the video AR mode, and thus a user can respond to the phone call or message being received while maintaining the information being viewed.

Further, in the case of switching over from the transparent AR mode to the video AR mode, the controller 140 may operate to display the image captured by the camera as the transparent display 110 is gradually changed from a transparent state to a semi-transparent state.

Further, the controller 140 may operate to completely replace a screen of an existing AR mode with a screen of an AR mode to be switched in accordance with a mode switching event. That is, the controller 140 may remove the screen of the existing AR mode, which is provided as a whole screen, and may provide the screen of the AR mode to be switched.

Further, it is also possible that the controller 140 operates to display the screen of the existing AR mode as an auxiliary screen and to display the screen of the AR mode to be switched as a main screen in accordance with the mode switching event. That is, the controller 140 may provide the screen of the existing AR mode as the auxiliary screen having a size that is smaller than a predetermined size, and may provide the screen of the AR mode to be switched as the main screen having a size that is equal to or larger than the predetermined size.

Further, it is also possible that the controller 140 divides the screen into first and second screens, and displays the AR mode to be switched on the first divided screen, while displays the existing AR mode on the second divided screen in accordance with the mode switching event. That is, the controller 140 may divide the screen into first and second screens that are two equal screens left and right or up and down, and displays the screen of the existing AR mode as the first screen while displays the screen of the AR mode to be switched as the second screen.

Further, if a predetermined event for switching over to the AR mode occurs, the controller 140 may provide a user interface (UI) to guide the switching over to the AR mode.

On the other hand, the controller 140 may recognize attributes of an object that is included in an image of a rear background of the transparent display device 100, for example, a color of the object or a text written on the object, an image drawn on or attached to the object, and a position of the object, through analysis of the image of the rear background to provide a corresponding AR object on the screen, that is, the transparent display 110, of the transparent display device 100. For example, in the case of the color of the object, the controller 140 may detect an edge of the image that is captured through the camera 120 and may detect the color of the inside of the detected edge. Even in the case of the text or image, the controller 140 may detect the text or image from the image that is captured through the camera 120 using a text or image reading algorithm. Further, in addition to the capturing, the controller 140 may acquire not only latitude, longitude, and altitude positions but also accurate time information together with three-dimensional (3D) speed information from a global positioning system (GPS) which may also be included in the transparent display device 100 according to an exemplary embodiment. If the color, text, image, position information, and time information are detected, the controller 140 may control the graphic processor 130 to render the AR object that corresponds to the detected object information on the transparent display 110.

However, the controller 140 may not directly or automatically perform the AR mode switching according to the predetermined event, but may provide a user with a UI to recommend the AR mode switching.

Further, in the case of providing AR information (or an AR object), the controller 140 may provide only AR object having a little probability of escaping from user's gaze or eyesight, i.e., having a high hitting rate, through recognition of the user's gaze.

Further, the controller 140 may provide only information of a portion where plural users' regions of concern overlap one another, i.e., only AR object having a low hitting rate.

Further, the controller may change a display type of the AR object so that the AR object can be accurately recognized by a user in accordance with the user's gaze. For example, the controller 140 may change the size, shape, color, and contrast of the AR object to provide the changed AR object to the user.

Further, it is also possible that the controller 140 provides an AR function to display AR object on the transparent display 110 or automatically changes an AR mode by recognizing a user's motion. For example, if a user's motion for turning on the AR function is recognized in a state where the AR function is turned off, the controller 140 may turn on the AR function.

According to another exemplary embodiment, a guider (not illustrated) may be provided on a surface of one side of the transparent display 110. Here, the guider (not illustrated) may be printed or a physical guide may be provided on a rear surface or front surface of the transparent display 110, and the guider may be implemented in the form of a predetermined line or a predetermined figure.

In the case of performing the AR function, the controller 140 may display a guide graphic user interface (GUI) having a shape that can be mapped on the guider to guide so that a user's viewpoint coincides with an image capturing viewpoint of the camera 120. For example, the guide that is displayed may have the same shape as the guider provided in the transparent display device 100, or may have a shape that is similar to or different from the shape of the guider. However, in the case where the shape of the guide is similar to or different from the shape of the guider, the guide may be implemented to have a predetermined shape that is related to the shape of the guider provided in the transparent display device 100.

Accordingly, a user may adjust a position of the guide line being displayed so that an image capturing angle of the camera 120 coincides with the user's gaze. In this case, a position adjustment of the guide line may be performed in various ways, such as screen touch and operation of up, down, left, and right buttons.

Further, the controller 140 may control to display an image captured by the camera 120 on the transparent display 110 in the form of an edge image to guide so that an image that is penetratingly seen by a user through the transparent display 110 coincides with the image captured by the camera 120.

The guide function as described above may be applied to not only the AR mode but also a general image capturing mode provided in the transparent display device 100.

Figure 4:
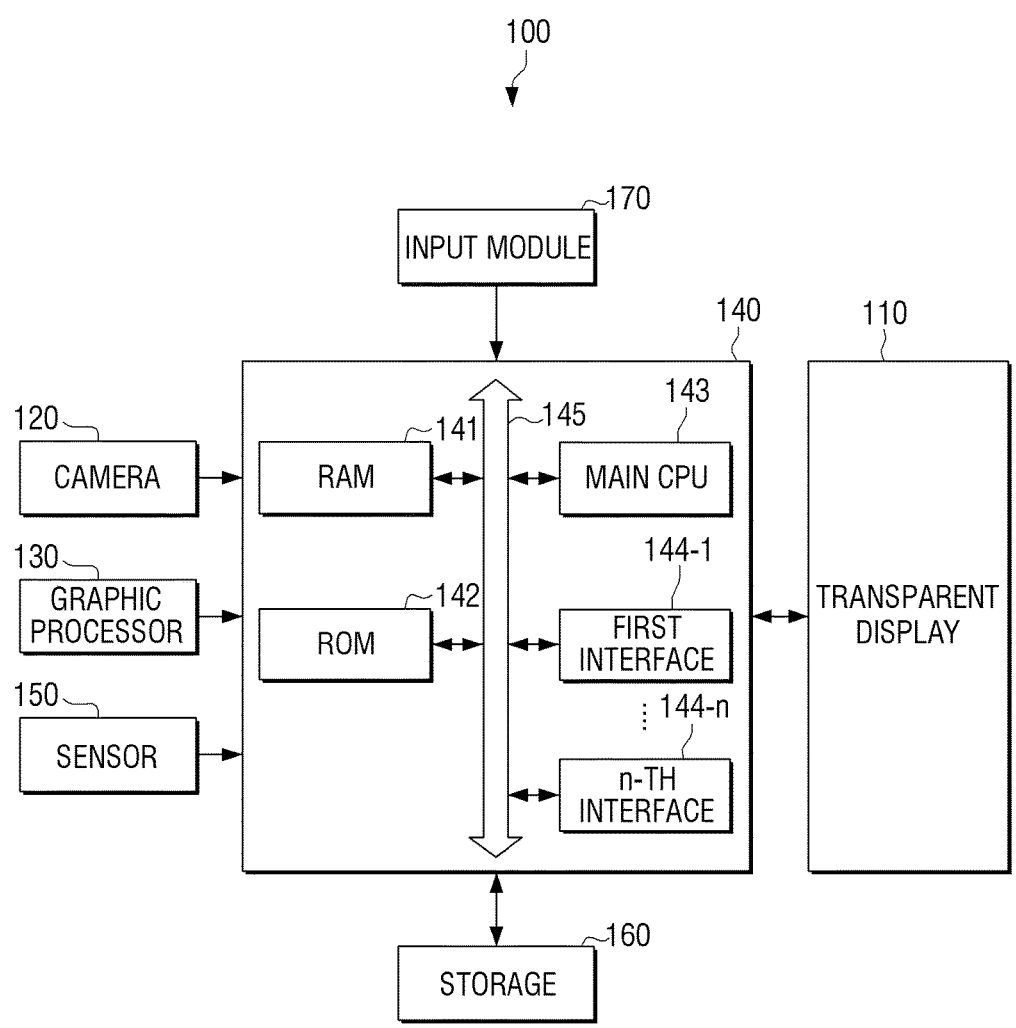
FIG. 4 is a block diagram explaining a configuration of a transparent display device, according to an exemplary embodiment.

FIG. 4 is a block diagram explaining a configuration of a transparent display device according to an exemplary embodiment. Referring to FIG. 4, a transparent display device 100 includes a transparent display 110, a camera 120, a graphic processor 130, a controller 140, a sensor 150, a storage 160, and an input module 170. With respect to constituent elements illustrated in FIG. 4 that are the same as the constituent elements illustrated in FIG. 2, the detailed explanation thereof will be omitted.

The sensor 150 senses background information about the transparent display 110. Here, the background information may include illumination information and information about objects included in the background. Accordingly, the sensor 150 may be implemented by or include an illumination sensor, an infrared (IR) sensor a complementary metal-oxide-semiconductor (CMOS) sensor, or any other image pickup sensor. In this case, the illumination sensor may use various kinds of photovoltaic, and in the case of measuring very low illumination, it is also possible to use photoelectric plates. For example, a CdS illumination sensor may be provided in the transparent display device 100 to bidirectionally sense the illumination. In this case, the illumination sensor may be installed in at least one predetermined region on both surfaces of the transparent display device 100, and it is also possible to install the illumination sensor in the unit of a pixel of both surfaces of the transparent display device 100. For example, the CMOS sensor may be installed in an enlarged shape to correspond to the size of the transparent display 110 as the illumination sensor to measure the illumination state of each region or each pixel.

In this case, the controller 140 may control the switching state of the AR mode on the basis of the background information sensed by the sensor 150.

For example, in the case of moving from a place where peripheral illumination is bright to a dark place in the transparent AR mode, the eye may temporarily become unable to recognize any display information to cause viewing interruption to occur. Accordingly, if this event occurs, in which the peripheral illumination becomes equal to or lower than a predetermined threshold value, the mode may switch over to the video AR mode.

Further, in the case of moving from a place where peripheral illumination is dark to a bright place in the video AR mode, the screen may not be seen well. Accordingly, if this event occurs, in which the peripheral illumination exceeds a predetermined threshold value, the mode switches over to the transparent AR mode.

Further, the sensor 150 senses a distance between the camera 120 and an object. In this case, the sensor 150 may be implemented by an image pickup sensor, a depth sensor, or a distance sensor.

In this case, the controller 140 may control the switching state of the AR mode on the basis of the distance between the camera 120 and the object that is sensed by the sensor 150.

For example, in order to simultaneously see an object behind the transparent display 110, which is penetratingly seen through the transparent display 110, and the AR object that is displayed on the transparent display 110 in the transparent AR mode, it is required that the object is within a predetermined distance behind the transparent display 110. Accordingly, if an event occurs, in which the distance between the object and the transparent display 110 becomes equal to or larger than a predetermined threshold distance, the AR mode switches over to the video AR mode.

Further, the sensor 150 senses a battery residual amount. In this case, the sensor 150 may be implemented to include a battery residual amount measurement circuit.

In this case, the controller 140 may control the AR mode switching on the basis of the battery residual amount that is sensed by the sensor 150.

For example, in the video AR mode, an image captured by the camera 120 should be displayed, and thus battery consumption becomes relatively greater than that in the transparent AR mode. Accordingly, if an event occurs, in which the battery residual amount becomes equal to or smaller than a predetermined threshold value, the AR mode switches over to the transparent AR mode.

Further, the controller 140 may adjust at least one of a luminance value and a color value of a pixel region that corresponds to the AR object displayed on the transparent display 110 on the basis of the illumination information sensed by the sensor 150. For example, if peripheral illumination of the transparent display device 100 is entirely high and distinctiveness of the information being displayed thereon is weak, the controller 140 may reduce luminance of the pixel region that corresponds to the AR object so that the displayed AR object can be clearly recognized. In this case, the controller 140 may differently adjust the luminance in accordance with the characteristics of display elements (e.g., LCD or OLED) that constitute the transparent display 110.

Further, the controller 140 may change a display position of the AR object that is displayed on the transparent display 110 on the basis of the background information sensed by the sensor 150. For example, in the case of displaying the AR object in a state where a background object that is positioned in the rear background of the transparent display device 100 is seen through the transparent display 110, the controller 140 may change a display state of the AR object on the basis of a position where the background object is seen by the user, a shape and a color of the background object. Here, the background object exists with a concrete shape, and may be one of various things, such as products that can be sold, animals and plants, furniture, walls, and wall papers, not being limited thereto.

In this case, the sensor may sense the position of the background object included in the rear background through a captured image, sense a strength of light that is incident from the rear of the transparent display device 100 using a light sensor, and sense a position of the background object through analysis of strength distribution of the light. As another example, a user or a manager may directly input a position of the background object so that the controller 140 determines the position of the object.

Further, the sensor 150 may detect a position of a user positioned in front of the transparent display device 100. Even in this case, in the same manner as described above, the position of the user may be detected using an image pickup device or a light sensor.

As described above, sensing the position of the background object included in the rear background and the position of the user through the sensor 150 may be differently implemented according to various embodiments.

The storage 160 may store images captured by the camera 120, information about the background object position and the user position and other various pieces of information, various kinds of setting information set by the user in relation to the operations of the transparent display device 100, system operating software, and various kinds of application programs.

The input module 170 is a portion which receives various user commands in relation to the operations of the transparent display device 100. The input module 170 may be implemented in various types, such as a touch panel or touch screen provided on at least one surface of the transparent display, various kinds of buttons provided on a main body of the transparent display device 100, and an input/output (I/O) interface receiving various kinds of input signals from an external input means, such as a keyboard or a mouse connected to the transparent display device 100. The user may turn on/off the AR function or AR mode automatic switching function through the input module 170, and may set a condition for moving the AR object display position or a display attribute change method during the movement.

As an example, the touch panel may be provided on both surfaces of the transparent display 110 so that touch operations become possible on the front surface and the rear surface of the transparent display 110 as well.

Further, the transparent display device 100 may further include a gaze recognizer (not illustrated) for recognizing a user's gaze.

The gaze recognizer (not illustrated) tracks a user position, i.e., a user's face position, and provides corresponding information to the controller 140. For this, a tracker (not illustrated) may include an image pickup element (not illustrated) and a detector (not illustrated).

The image pickup element (not illustrated) is arranged on an outer region of the transparent display device 100 to pick up an image of a user. For example, the image pickup element may be arranged on an upper center, left center, or right center bezel region, but is not limited thereto.

The image pickup element (not illustrated) includes a lens module including a lens for the image pickup and an image sensor. A shape that is input through the lens is input as an optical signal to the image sensor that serves as a film, and the image sensor converts the input optical signal into an electrical signal and transfers the converted signal to the detector (not illustrated).

The detector (not illustrated) detects the user's face position from the captured user image that is received from the image pickup element (not illustrated) and tracks the user's face position. Specifically, the detector (not illustrated) may track the user's moving position on the basis of the position of the user's face region that is detected from a previous frame and a current frame, and may provide corresponding information to the controller 140.

As the face region detection method, one of various methods in the related art may be used. Specifically, a direct recognition method and a method using statistical information may be used. According to the direct recognition method, rules are made using physical features, such as a contour and a skin color of a face image that appear on the screen, sizes of constituent elements, and a distance between the constituent elements, and comparison, test, and measurement are performed according to the rules. According to the method using the statistical information, the face region is detected according to a pre-learned algorithm.

That is, according to this method, inherent features of an input face are compared and analyzed with mass database (shapes of faces and other things) prepared as data. In particular, the face region can be detected according to the pre-learned algorithm, and the method, such as multilayer perception (MLP) or support vector machine (SVM), may be used. The detailed explanation thereof will be omitted.

On the other hand, the controller 140 includes a random-access memory (RAM) 141, a read-only memory (ROM) 142, a main central processing unit (CPU) 143, first to n-th interfaces 144-1 to 144-n, and a bus 145.

The RAM 141, the ROM 142, the main CPU 143, and the first to n-th interfaces 144-1 to 144-n may be connected to one another through the bus 145.

The first to n-th interfaces 144-1 to 144-n are connected to various kinds of constituent elements as described above. One of the interfaces may be a network interface that is connected to an external device through a network.

The main CPU 143 accesses the storage 160 and performs booting using an operating system (OS) stored in the storage 160. Further, the main CPU 143 performs various operations using various kinds of programs, content, and data stored in the storage 160.

A command set for system booting is stored in the ROM 142. If a turn-on command is input and the power is supplied, the main CPU 143 copies the OS stored in the storage 150 into the RAM 141 according to the command stored in the ROM 142, and boots the system by executing the OS. If the booting is completed, the main CPU 1943 copies various kinds of application programs stored in the storage 160 into the RAM 141, and performs various kinds of operations by executing the application programs copied into the RAM 141.

Figure 5:
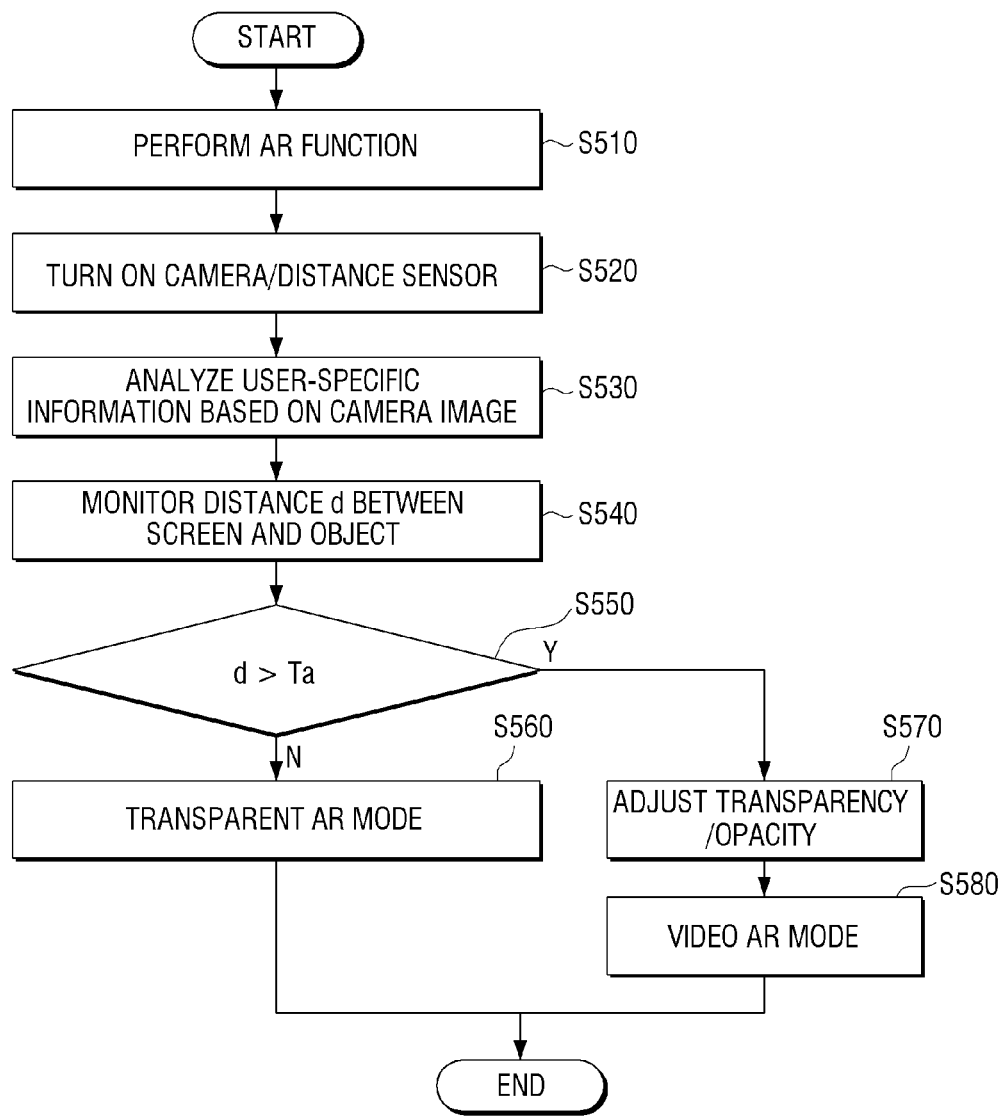
FIG. 5 is a flowchart explaining an AR mode switching function of a transparent display device in reference to FIGS. 2 and 4, according to an exemplary embodiment.

FIG. 5 is a flowchart explaining an AR mode switching function of a transparent display device in reference to FIGS. 2 and 4, according to an exemplary embodiment.

According to the embodiment illustrated in FIG. 5, if an AR function is executed at the transparent display device 100 according to a predetermined event (S510), the camera 120 and a distance sensor included in the sensor 150 are turned on (S520). Here, the predetermined event may be one of various events including user commands.

Then, user custom information is analyzed on the basis of an image of an object captured by the camera 120 (S530). An AR object that corresponds to the captured image or information related to the capture image may be generated through extracting and searching for this information on the basis of the captured image. For example, if the captured image is food, the AR object that corresponds to calorie information about the corresponding food may be generated.

Then, a distance d between a screen, i.e., the transparent display 110, and the object is monitored (S540). In this case, as described above, the camera 120, and a distance sensor and a depth sensor included in the sensor 150 may be used to monitor the distance.

If the distance d between the transparent display 110 and the object is not greater than a predetermined threshold distance Ta (S550: N), on the basis of the distance d between the transparent display 110 and the object, a transparent AR mode is activated (S560). That is, the AR object may be displayed in a state where a rear background is transparently seen through the transparent display 110.

If the distance d between the transparent display and the object is greater than the predetermined threshold distance Ta (S550: Y), a video AR mode is activated (S580) through adjustment of a transparent/opaque state (S570). That is, the AR object may be displayed in a state where an image that is captured by the camera 120 is displayed on the screen that is adjusted to be opaque.

Accordingly, it becomes possible to construct a natural, user-friendly screen according to the distance d between the transparent display 110 and the object.

Figure 6:
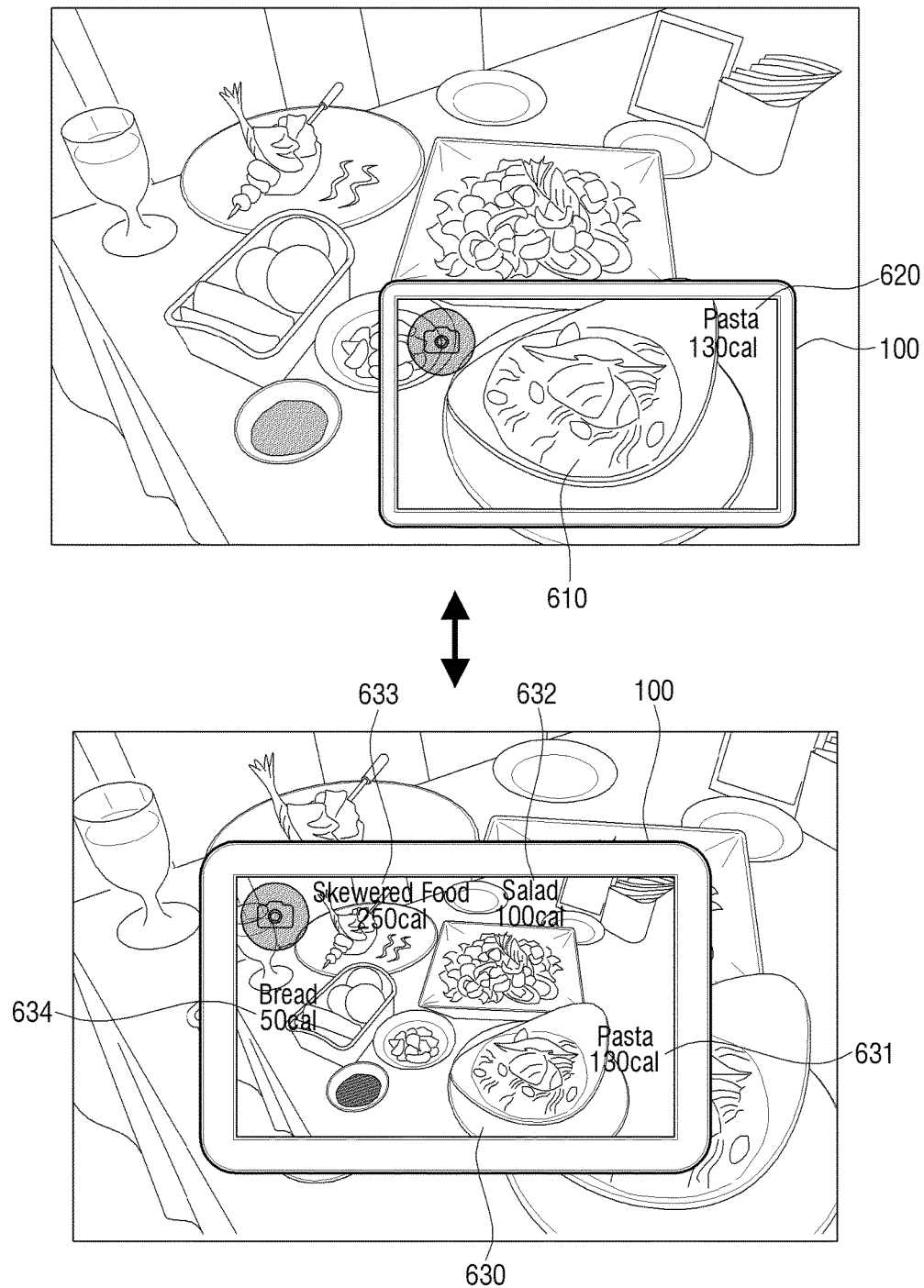
FIG. 6 is an illustrative view for the flowchart of FIG. 5, according to an exemplary embodiment.

FIG. 6 is an illustrative view for the flowchart of FIG. 5, according to an exemplary embodiment.

As illustrated in FIG. 6, if an object, for example, a pasta 610, is captured within the predetermined threshold distance Ta in a state where the AR function is turned on, the transparent AR mode is executed, and information that corresponds to the object, for example, an AR object 620 including calorie information, may be displayed in a state where the pasta 610 is transparently seen through the transparent display 110.

Then, if the distance d between the object and the screen, that is, the transparent display 110, exceeds the predetermined threshold distance Ta, the transparent AR mode replaces the video AR mode. Specifically, as the screen is adjusted to become gradually opaque, an image 630 that is captured by the camera is displayed, and AR object related to the image 630, for example, AR object 631 to 634 that is related to pasta, salad and bread may be displayed together. In this case, although the AR object may be rendered and displayed together with the captured image, the AR object may be displayed in the form of an OSD on the displayed image, or may be displayed on a layer that is different from the layer on which the captured image is displayed.

Figure 7:
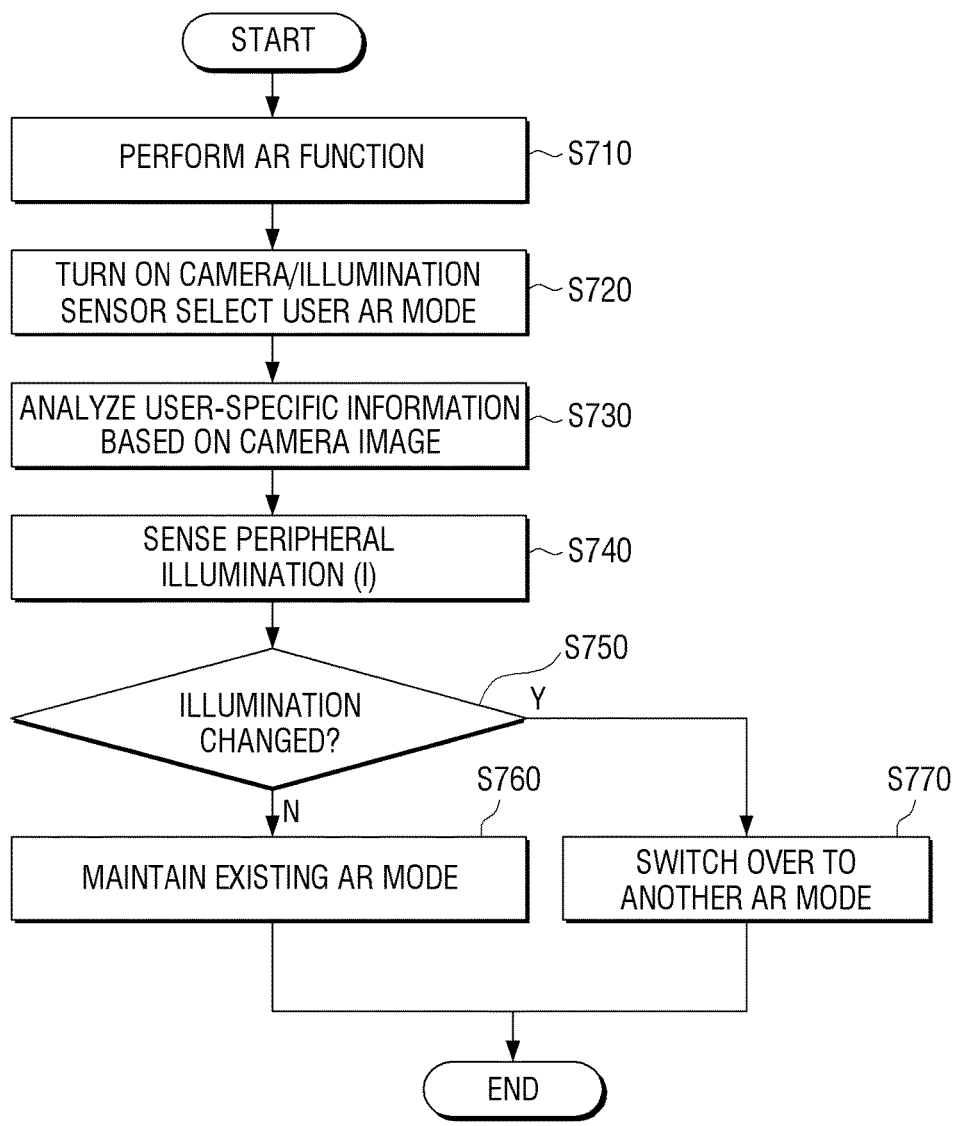
FIG. 7 is a flowchart explaining an AR mode switching function of a transparent display device in reference to FIGS. 2 and 4, according to another exemplary embodiment.

FIG. 7 is a flowchart explaining an AR mode switching function of a transparent display device in reference to FIGS. 2 and 4, according to another exemplary embodiment.

According to the embodiment illustrated in FIG. 7, if an AR function is executed at the transparent display device 100 according to a predetermined event (S710), the camera 120 and an illumination sensor included in the sensor 150 are turned on (S720). Here, the predetermined event may be one of various events including user commands.

Then, user custom information is analyzed on the basis of an image of an object captured by the camera 120 (S730). An AR object that corresponds to the captured image or information related to the captured image may be generated through extracting and searching for this information on the basis of the captured image. For example, if the captured image is food, the AR object that corresponds to calorie information about the corresponding food may be generated.

Then, peripheral lighting (or illumination) is sensed (S740). In this case, as described above, the camera 120 and the illumination sensor may be used to sense the lighting.

If the peripheral lighting is not changed over a predetermined threshold value (S750: N), an existing AR mode is maintained (S760).

Further, if the peripheral lighting is changed over the predetermined threshold value (S750: Y), the existing AR mode may switch over to another AR mode, e.g., the video AR mode (S770). However, according to circumstances, it is also possible to provide a UI that guides the AR mode switching.

In this case, although it is possible to completely replace the existing AR mode with the other AR mode, it is also possible to provide the existing AR mode as an auxiliary screen and to provide the other AR mode as a main screen in the transparent display 110. Further, it is also possible to divide the screen of the transparent display 110.

Figure 8:
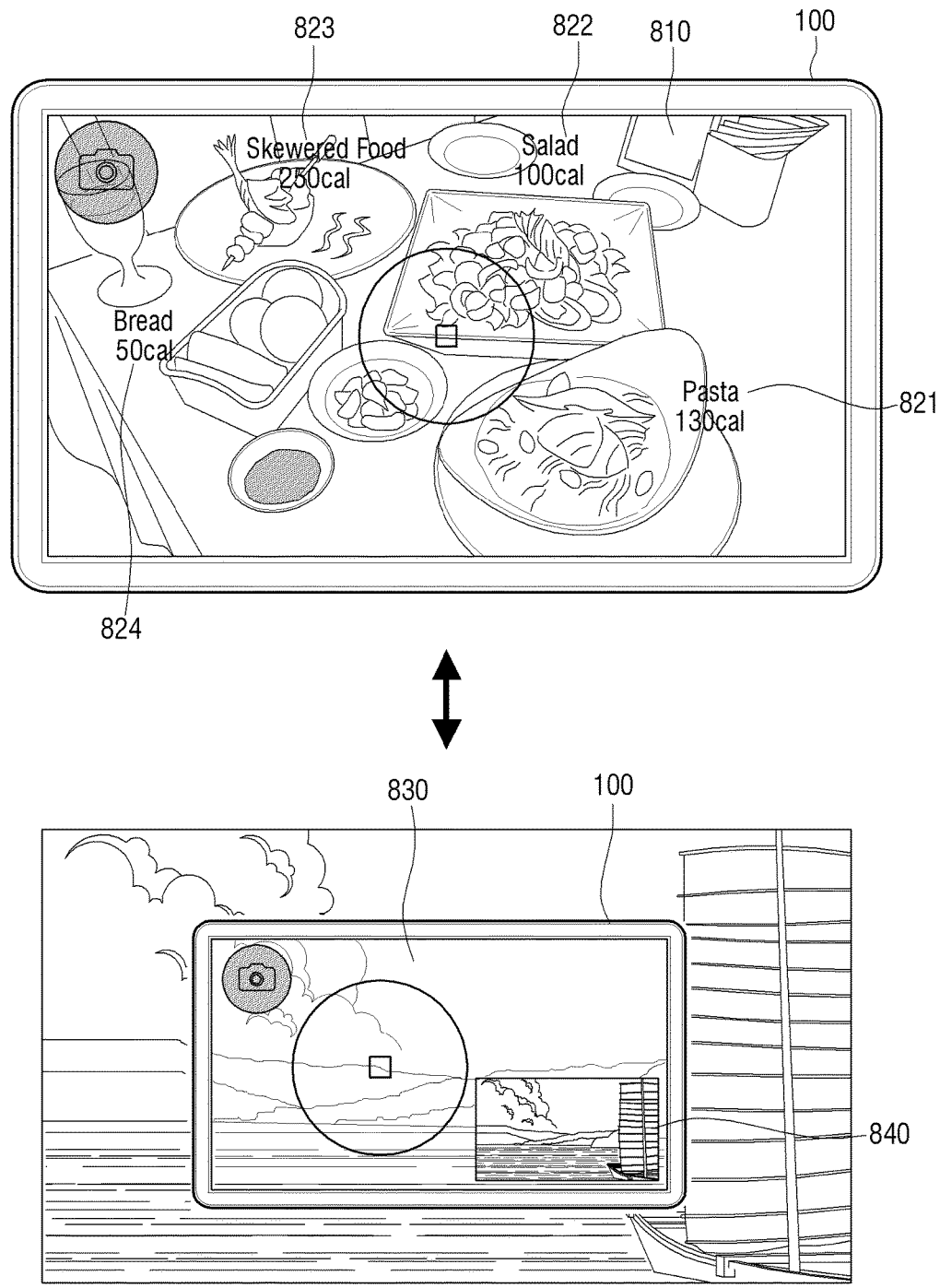
FIG. 8 is an illustrative view for the flowchart of FIG. 7, according to an exemplary embodiment.

FIG. 8 is a view e for the flowchart of FIG. 7, according to an exemplary embodiment.

As illustrated in FIG. 8, it is assumed that the peripheral illumination is changed to a state where it is appropriate to provide the transparent AR mode in a state where the video AR mode is provided, i.e., AR objects 821 to 824 are provided on an image 810 captured by the camera.

For example, in the case of moving from indoors having dark illumination to outdoors having bright illumination, and in particular, to a place where sunlight is glaring, a screen according to the video AR mode may be displayed as an auxiliary screen 840, and a screen according to the transparent AR mode may be displayed as a main screen 830.

On the other hand, although not illustrated in the drawing, in the case of moving from an environment having bright illumination to an environment having dark illumination during execution of the transparent AR mode, the transparent AR mode may be provided as an auxiliary screen and the video AR mode may be provided as a main screen.

Figure 9:
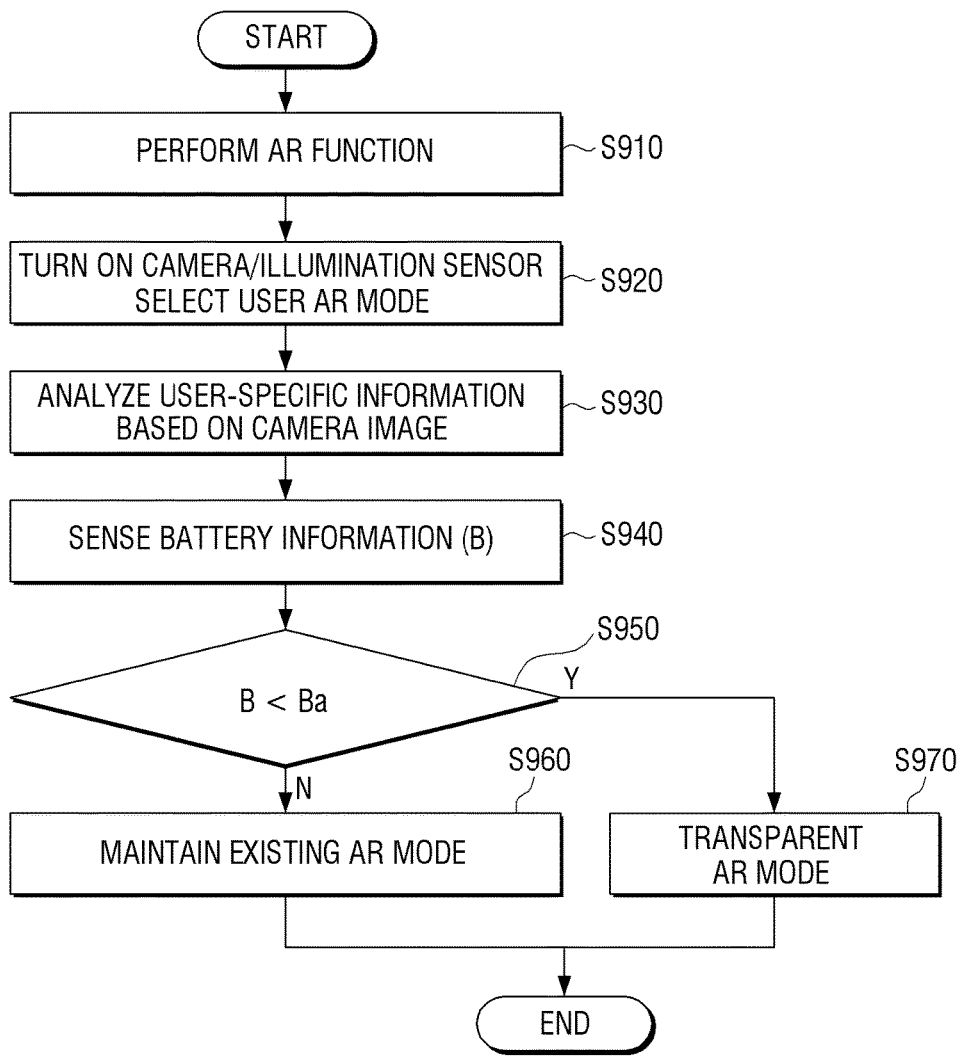
FIG. 9 is a flowchart explaining an AR mode switching function of the transparent display device 100 in reference to FIGS. 2 and 4, according to still another exemplary embodiment.

FIG. 9 is a flowchart explaining an AR mode switching function of the transparent display device 100 in reference to FIGS. 2 and 4, according to still another exemplary embodiment.

According to the embodiment illustrated in FIG. 9, if an AR function is executed at the transparent display device 100 according to a predetermined event (S910), the camera 120, an illumination sensor included in the sensor 150, and a distance sensor also included in the sensor 150 are turned on (S920). Here, the predetermined event may be one of various events including user commands.

Then, user custom information is analyzed on the basis of an image of an object captured by the camera 120 (S930). An AR object that corresponds to the captured image or information related to the captured image may be generated through extracting and searching for this information on the basis of the captured image.

Then, battery information is sensed (S940). In this case, as described above, a battery measurement circuit may be used to sense a battery residual amount B.

If the sensed battery residual amount B is not smaller than a predetermined threshold value Ba (S950: N), an existing AR mode is maintained (S960).

Further, if the sensed battery residual amount B is smaller than the predetermined threshold value Ba (S950: Y), the mode may switch over to another AR mode, e.g., the transparent AR mode (970). In this case, however, if the existing AR mode is a transparent AR mode, the existing AR mode is maintained, while if the existing AR mode is the video AR mode in which battery consumption becomes great, the AR mode may switch over to the transparent AR mode. However, according to circumstances, it is also possible to provide a UI that guides the AR mode switching.

Further, although not illustrated in the drawing, if the sensed battery residual amount B is smaller than a predetermined minimum threshold value, it is also possible to compulsorily end the existing AR mode.

Figure 10:
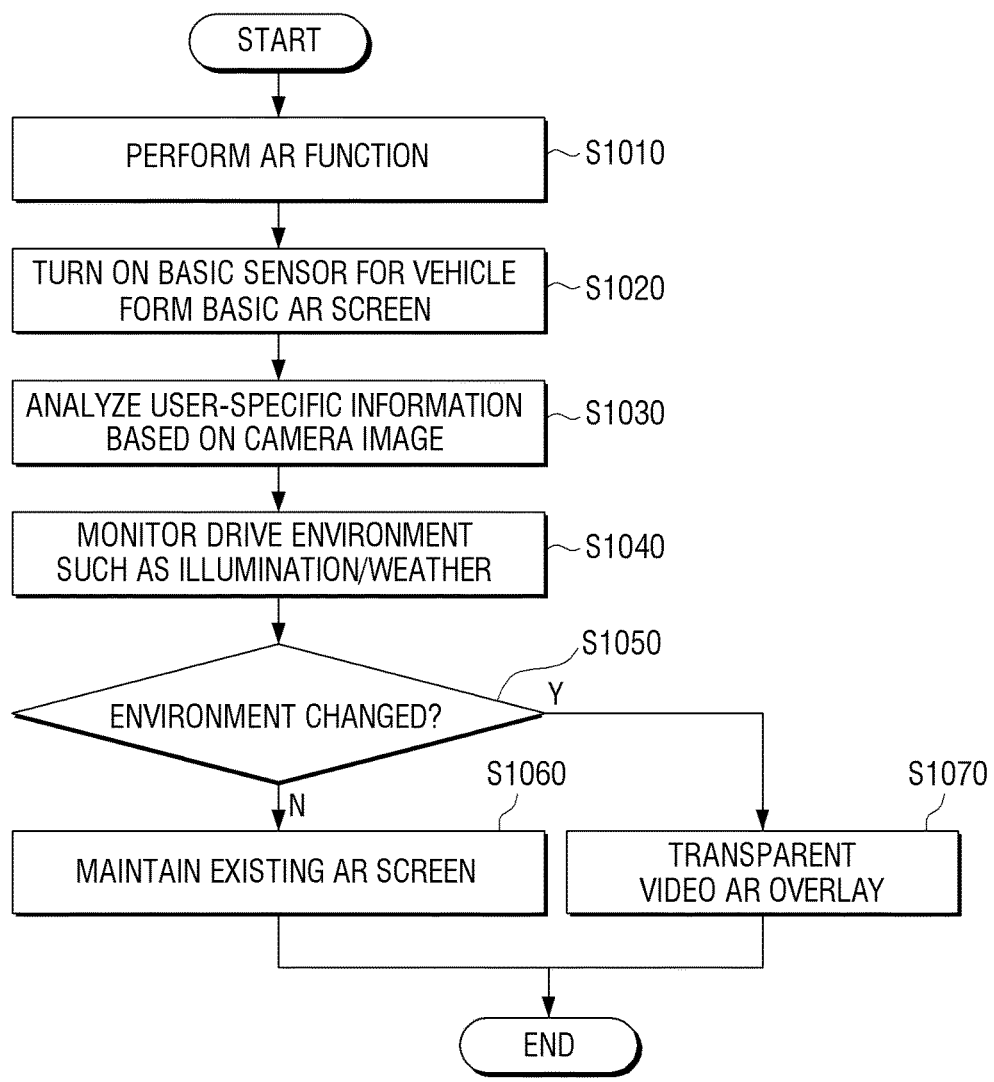
FIG. 10 is a flowchart explaining an AR mode switching function of the transparent display device 100 in reference to FIGS. 2 and 4, according to still another exemplary embodiment.

FIG. 10 is a flowchart explaining an AR mode switching function of the transparent display device 100 in reference to FIGS. 2 and 4, according to still another exemplary embodiment.

Referring to FIG. 10, if an AR function is executed in a transparent display which is provided on a front glass window of a vehicle according to a predetermined event (S1010), basic vehicle sensors, such as the camera 120, and an illumination sensor and a weather sensor included in the sensor 160, are turned on (S1020). Here, the predetermined event may be one of various events including user commands.

Then, user custom information is analyzed on the basis of an image of an object captured by the camera 120 (S1030). An AR object that corresponds to the captured image or information related to the captured image may be generated through extracting and searching for this information on the basis of the captured image.

Then, driving environment, such as illumination or weather, are monitored (S1040). In this case, as described above, the camera 120, the illumination sensor and the weather sensor may be used to monitor the driving environment.

Then, if a change is made to the driving environment (S1050: Y), i.e., if there is an environmental change that exerts an influence on driver's driving, the transparent AR mode and the video AR mode may be separately processed and then overlaid with each other to be provided to a driver (S1070). For example, in the case where the weather becomes dark and it rains, it becomes difficult to secure the front visual field, and thus the driver is hard to recognize the screen according to the transparent AR mode. In this case, an AR object of the video AR mode may be overlaid with the transparent AR mode to be provided to the driver.

However, if no change is made to the driving environment (S1050: N), the existing AR mode may be maintained.

On the other hand, if the driving environment is stabilized again in the step S1070 in which the transparent AR mode and the video AR mode are overlaid with each other to be provided to the driver, the mode may be changed back to the existing AR mode.

Figure 11:
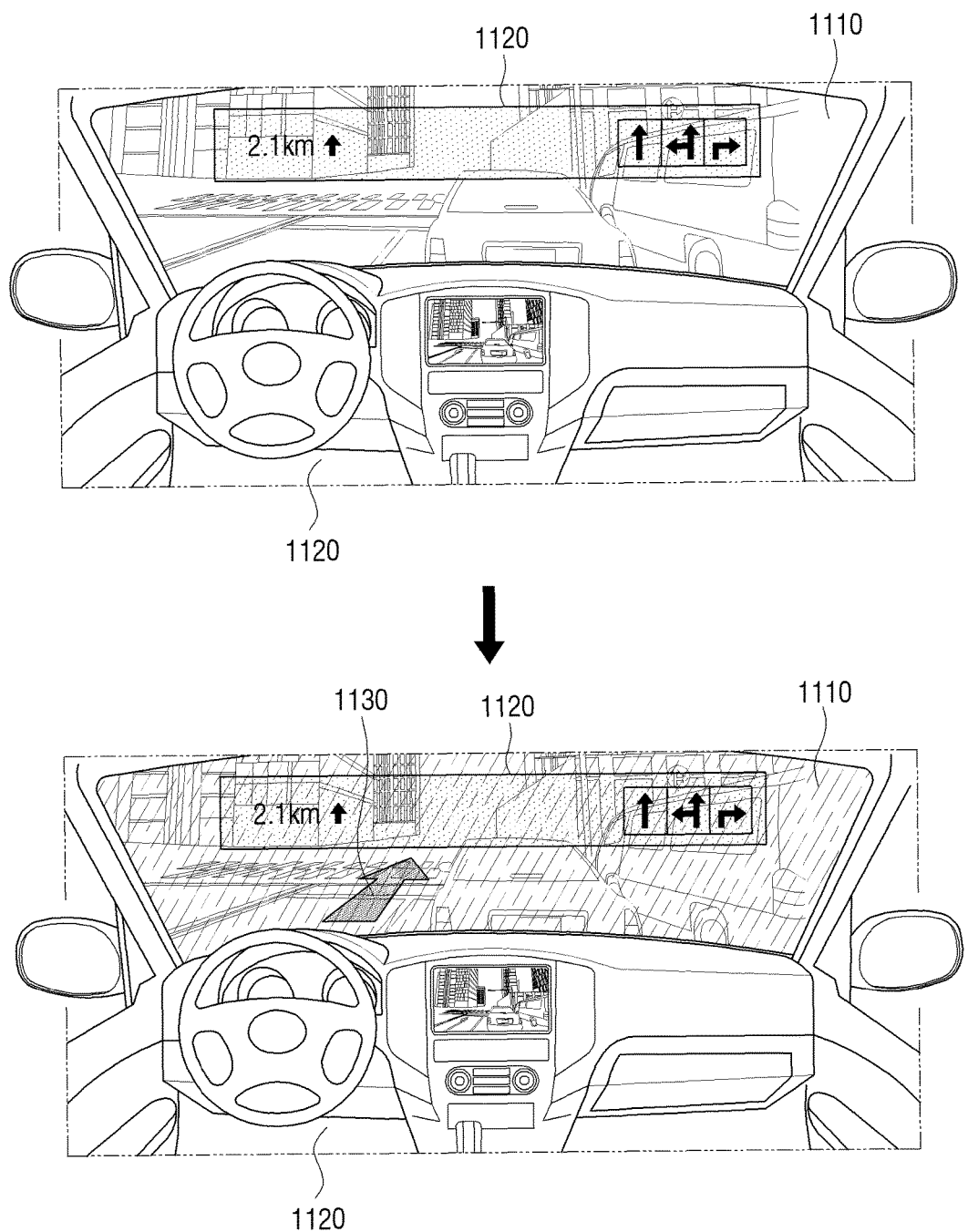
FIG. 11 is a view for the flowchart of FIG. 10, according to an exemplary embodiment.

FIG. 11 is a view for the flowchart of FIG. 10, according to an exemplary embodiment.

As illustrated in FIG. 11, it is assumed that the driving environment is changed in a state where the transparent AR mode is provided on the front glass window 1110 of the vehicle, i.e., an AR object 1120 is provided on the front transparent display 1110 of the vehicle (upper side in FIG. 11).

As shown on the lower side of FIG. 11, in the case where the weather becomes dark and it rains, it becomes difficult to secure the front visual field, and thus the driver is hard to recognize the screen according to the transparent AR mode. In this case, an AR object 1130 according to the video AR mode may be overlaid with the transparent AR mode to be provided to the user. For example, a contour line of the road and a silhouette of the front object may be projected onto the front glass window on the basis of the video AR to help the driver's safe driving.

Figure 12:
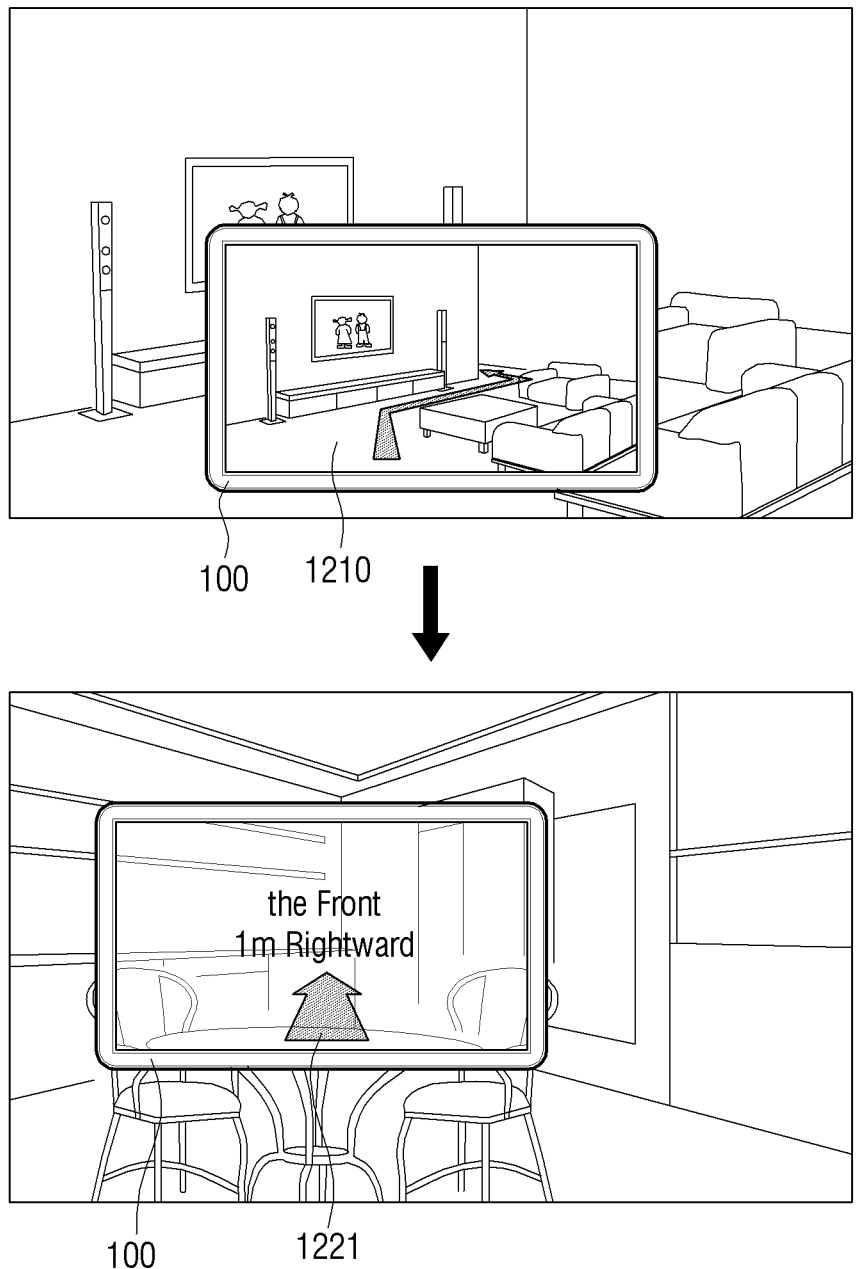
FIG. 12 is a view explaining an AR mode switching function of the transparent display device 100 in reference to FIGS. 2 and 4, according to still another exemplary embodiment.

FIG. 12 is a view explaining an AR mode switching function of the transparent display device 100 in reference to FIGS. 2 and 4, according to still another exemplary embodiment.

As illustrated in FIG. 12, if a distance between a user's current position, i.e., a position of a transparent display device 100, and a target position is equal to or greater than a predetermined distance while AR based navigation operates, a video AR mode may be provided to perform road guidance (upper side in FIG. 12). That is, an image 1210 that is captured by the camera 120 may be displayed together with an AR object.

Thereafter, in the case of entering from the target position within a predetermined distance, the AR mode may switch over to the transparent AR mode (lower side in FIG. 12) to provide safe and comfortable road guidance.

Further, although not illustrated in the drawing, it is also possible to grasp a user's gaze position through the camera 120 provided in the front of the transparent display device 100. If the user's gaze is directed to the front surface of the transparent display 110, the transparent AR mode may be provided, while if the user's gaze is directed to the upper side, lower side, or side surface of the transparent display 110, the video AR mode may be provided.

Figure 13:
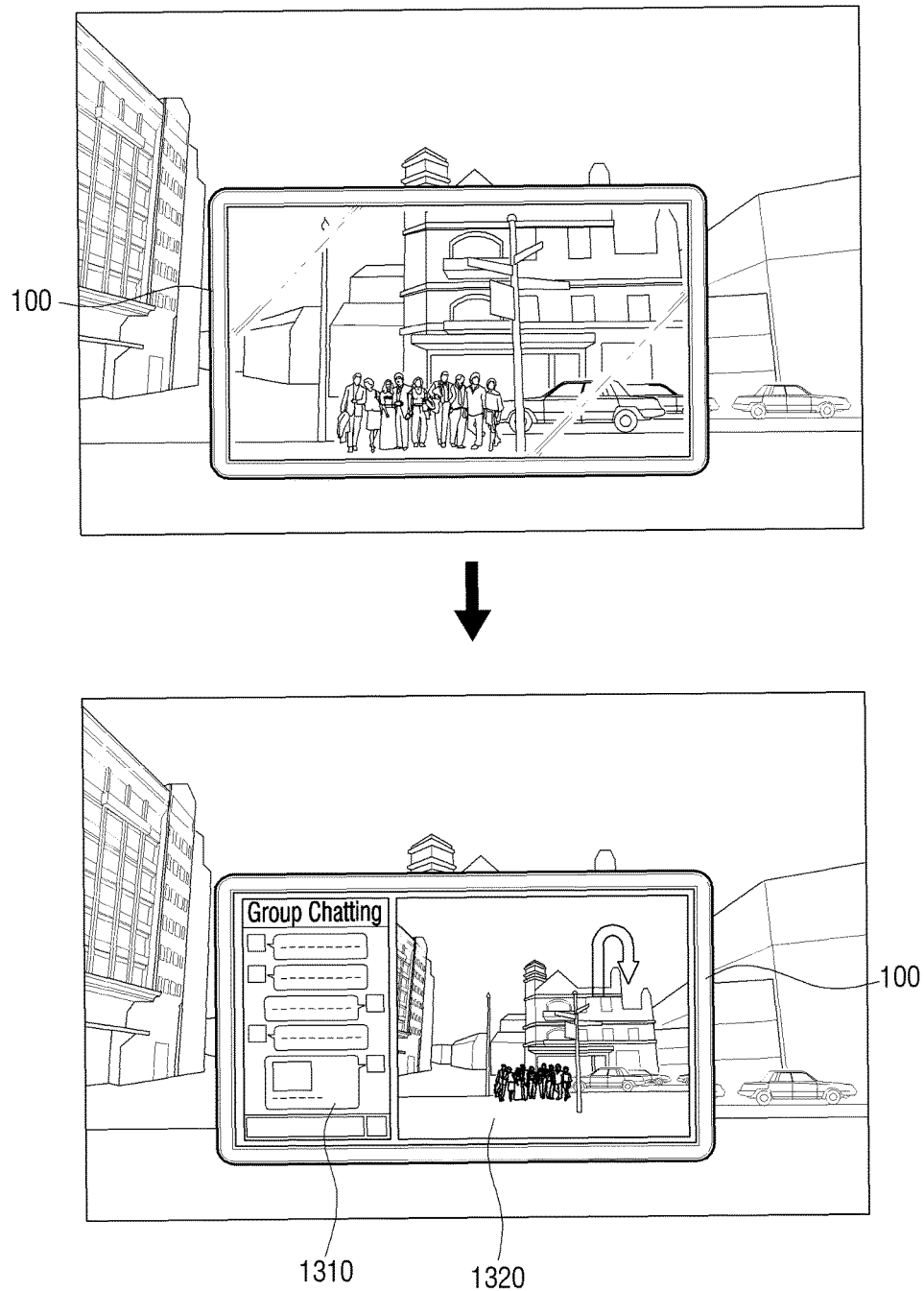
FIG. 13 is a view explaining an AR mode switching function of the transparent display device 100 in reference to FIGS. 2 and 4, according to still another exemplary embodiment.

FIG. 13 is a view explaining an AR mode switching function of the transparent display device 100 in reference to FIGS. 2 and 4, according to still another exemplary embodiment.

As illustrated in FIG. 13, if an event occurs, in which a phone call or a message is received at the transparent display device 100 during an operation in the transparent AR mode, the transparent display device 100 may change to the video AR mode while displaying contents corresponding to the event.

For example, if a message is received, the transparent display device 100 may provide a UI 1310 that is related to the received message on one region of the screen, and may provide contents 1320 according to the video AR mode on another region.

Figure 14:
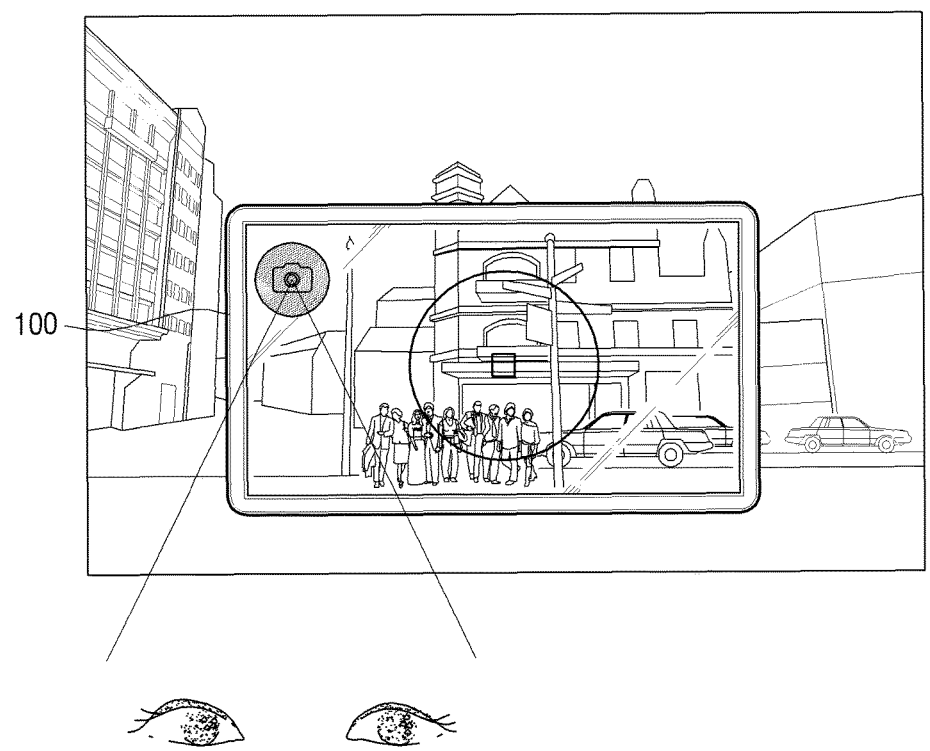
FIG. 14 is a view explaining an AR mode providing method at the transparent display device 100 in reference to FIGS. 2 and 4, according to an exemplary embodiment.

FIG. 14 is a view explaining an AR mode providing method at the transparent display device 100 in reference to FIGS. 2 and 4, according to an exemplary embodiment.

Referring to FIG. 14, in the case of providing an AR mode, user's gaze is sensed, and only an AR object having a little probability of escaping from the user's gaze, i.e., having a high hitting rate, through recognition of the user's gaze.

Further, although not illustrated in the drawing, only information about a portion where plural users' regions of concern overlap one another, i.e., only AR object having a low hitting rate, can be provided.

Figure 15A:
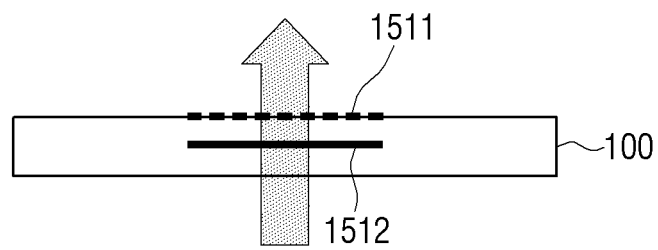
Figure 15B:
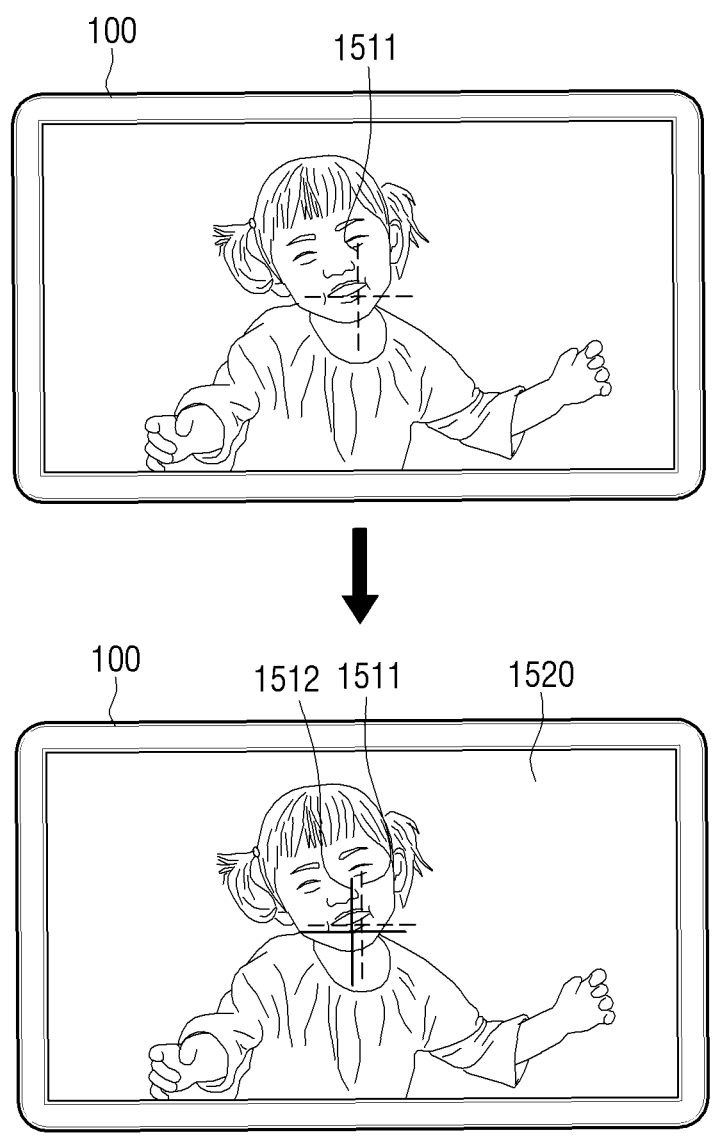
Figure 16B:
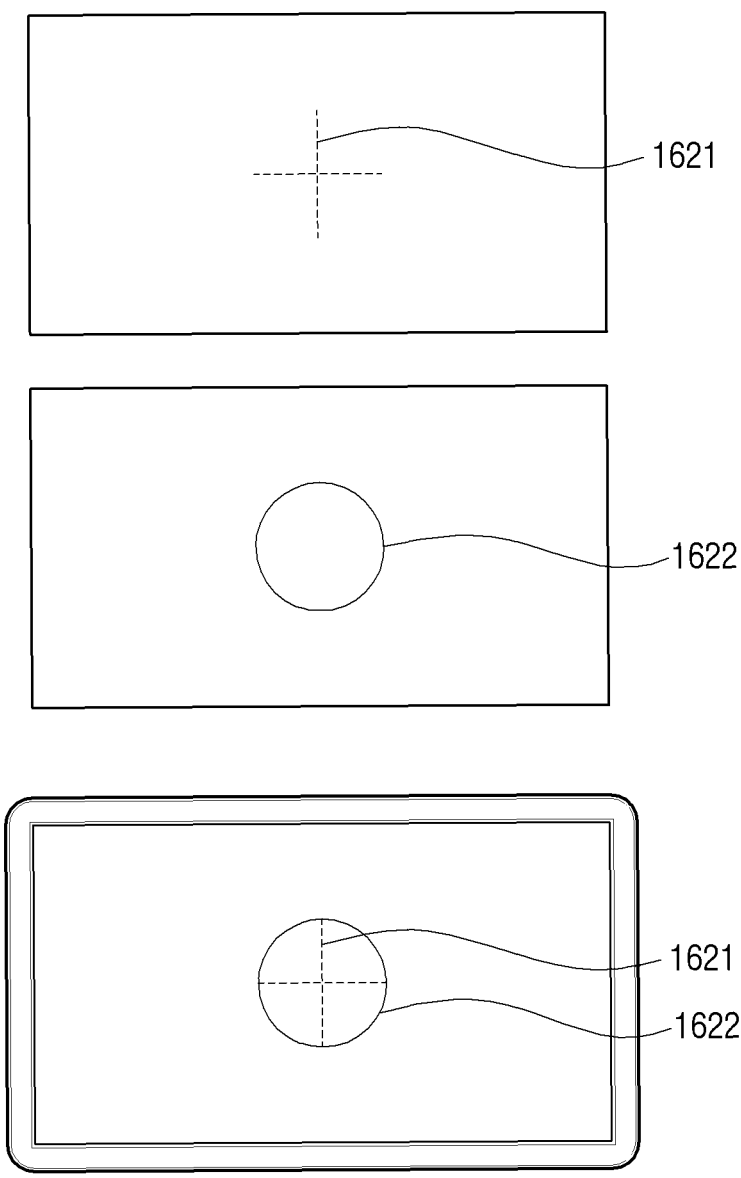
Figure 16C:
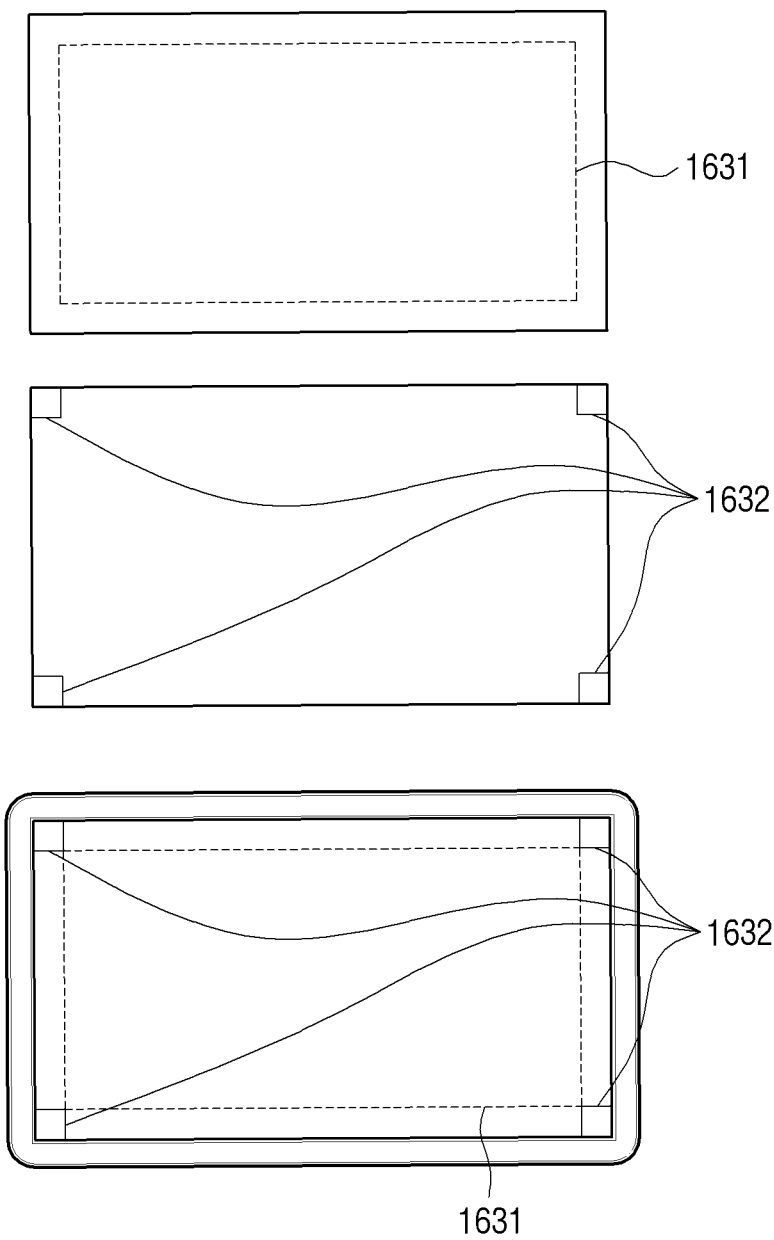
Figure 16D:
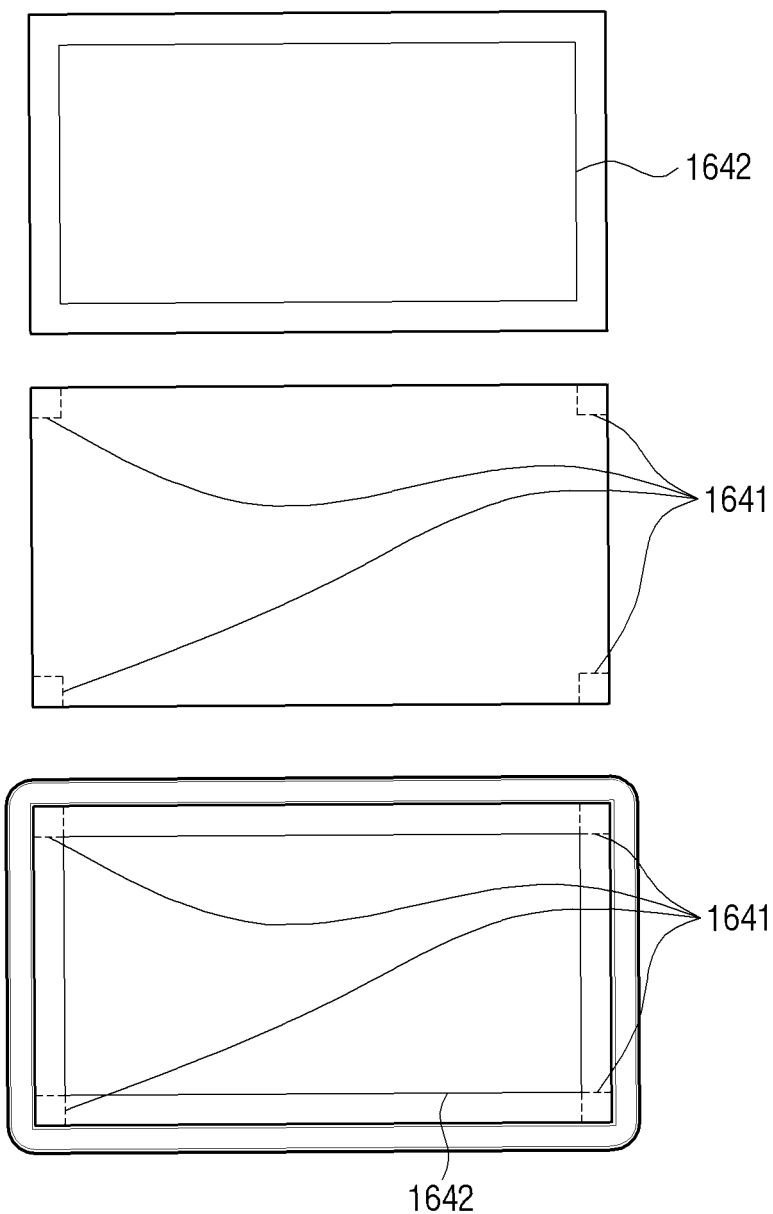

FIGS. 15A to 15C are views explaining a guide function of the transparent display device 100, according to an exemplary embodiment.

As illustrated in FIG. 15A, through a guider 1511 provided on a display surface of the transparent display device 100 and a guide GUI 1512 that is displayed in a display image, guidance may be provided so that an image according to a user's viewpoint coincides with an image captured by a camera.

According to an example illustrated in FIG. 15B, the cross-shaped guider 1511 that is the basis of an image that is shown through the transparent display device 100 in accordance with a user's viewpoint and the guide GUI 1512 that has the same shape and is the basis of a camera image 1520 are provided together.

In this case, as illustrated in FIG. 15C, a user may make the user's viewpoint and the camera viewpoint coincide with each other through adjustment of the position of the guide GUI 1512 to coincide with the position of the guider 1511.

FIGS. 16A to 16D are views illustrating various shapes of a guider and a guide GUI of a transparent display device in reference to FIGS. 2 and 4, according to exemplary embodiments.

In FIGS. 16A to 16D, dotted lines indicate guiders 1611, 1621, 1631 and 1641 that are provided on a screen, that is, the transparent display 120, of the transparent display device 100, and solid lines indicate guide GUIs 16112, 1622, 1632, and 1642 that are displayed in a display image. Further, the drawings that are illustrated on the lowermost side illustrate a case where the guiders 1611, 1621, 1631 and 1641 and the guide GUIs 1612, 1622, 1632 and 1642 are provided together to coincide with each other, and in the drawings, images are removed for convenience of explanation.

As illustrated, the guider and the guide GUI may be in the same shape or may be provided in various shapes that can match each other.

Figure 17A:
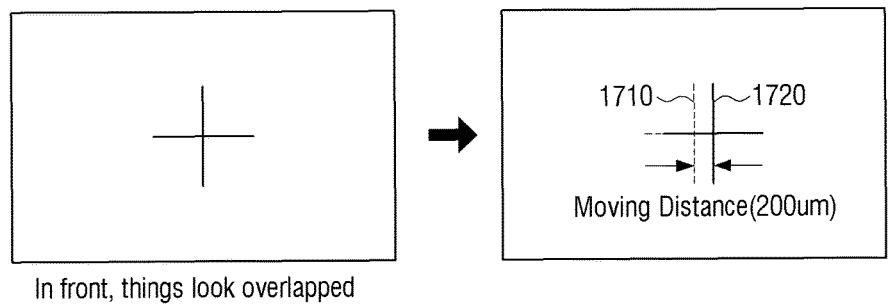

FIGS. 17A to 17C are diagrams explaining a guide GUI control method, according to exemplary embodiments.

As illustrated in FIGS. 17A and 17B, a user may set an angle at which the user captures an image of an object through adjustment of a position of a guide GUI 1720. In this case, the guide GUI 1720 may be formed in various types, such as screen touch and operation of up, down, left, and right buttons.

For example, if a user intends to capture an image of an object at an angle of 11° on the left side, the guide GUI 1720 may be moved as much as a corresponding distance from the guider 1710.

FIG. 17C is a table for explaining a moving distance that corresponds to a capturing angle. As illustrated in FIG. 17C, if a thickness of the transparent display device is 2 mm, the guide GUI may be moved by 200 μm that corresponds to an angle of 11° at which image capturing is to be performed.

Figure 18:
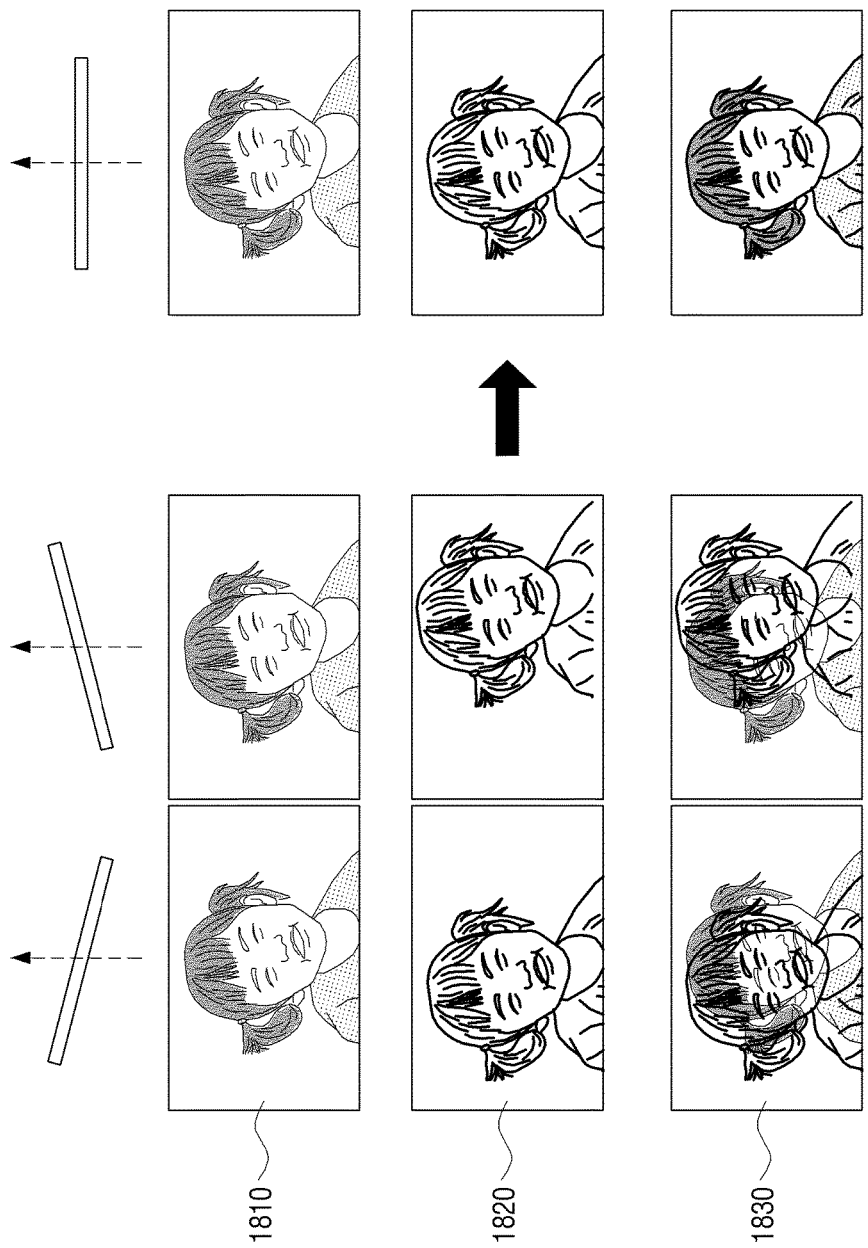
FIG. 18 is a view explaining a guide providing method, according to an exemplary embodiment.

FIG. 18 is a view explaining a guide providing method according to an exemplary embodiment may be performed in various ways, such as screen touch and operation of up, down, left, and right buttons.

Referring to FIG. 18, the transparent display device 100 may display an image 1820 captured by the camera 120 in the form of an edge image to provide a function of a guide GUI. In this case, a position of the edge image may be adjusted in accordance with various types of user operations, such as screen touch or up, down, left, and right button operations. In this embodiment, a user may make the user's gaze and a capturing direction of the camera 120 coincide with each other through adjustment of a position of an edge image 1810 to match an image 1810 that is transparently seen by the user through the transparent display 110 and the edge image 1820 captured by the camera 120 with each other. An image 1830 is the matched image.

Figure 19:
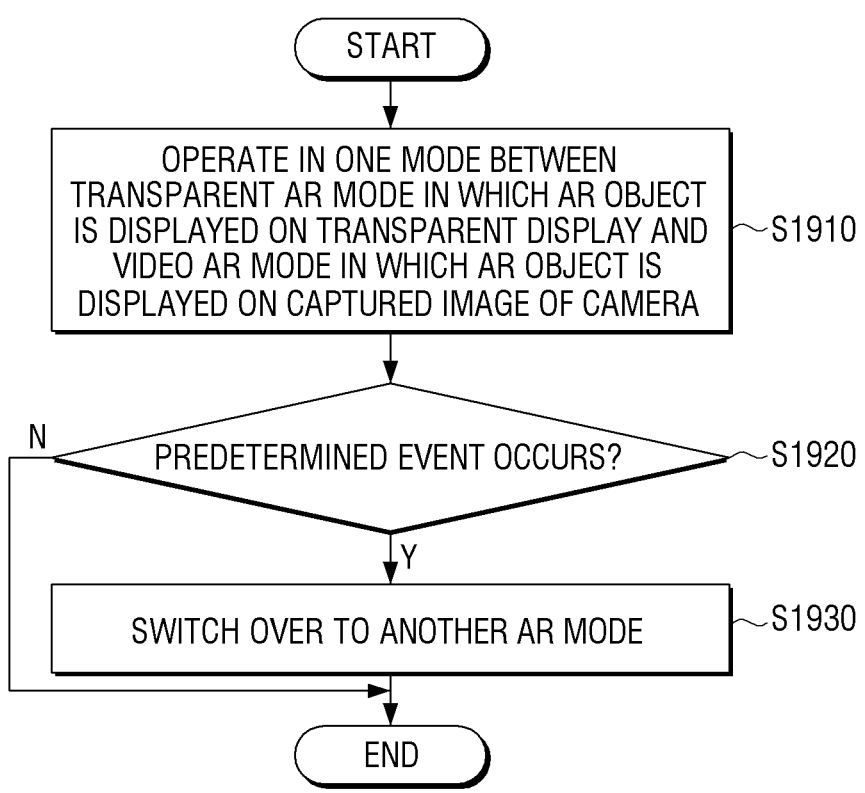
FIG. 19 is a flowchart explaining a method for controlling a transparent display device, according to an exemplary embodiment.

FIG. 19 is a flowchart explaining a method for controlling a transparent display device, according to an exemplary embodiment.

According to a method for controlling a transparent display device including a transparent display and a camera as illustrated in FIG. 19, the transparent display device 100 may operate in one mode of the transparent AR mode in which an AR object is displayed on the transparent display 110 and the video AR mode in which an AR object is displayed on an image captured by the camera (S1910). For example, the transparent display device 100 may operate in one AR mode in accordance with a user command to execute an AR function in addition to selection of the AR mode.

Then, if a predetermined event occurs (S1920: Y), the mode switches over to another AR mode (S1930).

The method may further include sensing a distance between the transparent display device 100 and an object. Here, the switching over to the other AR mode (S1930) may be performed if a corresponding event occurs, in which the sensed distance satisfies a predetermined condition.

Further, the method may further include sensing at least one of illumination information and viewing environment information. In this case, the switching over to the other AR mode (S1930) may be performed if a corresponding event occurs, in which at least one of the sensed illumination information and the sensed viewing environment information satisfies a predetermined condition.

Further, the method may further include sensing a battery residual amount. In this case, the switching over to the other AR mode (S1930) may be performed if a corresponding event occurs, in which the sensed battery residual amount satisfies a predetermined condition.

By switching over to the other AR mode (S1930), the transparent display device 100 may display a screen according to the video AR mode by gradually reducing transparency of the transparent display 110 if a mode switching event occurs during the operation in the transparent AR mode.

By switching over to the other AR mode (S1930), the transparent display device 100 may display the other AR mode as a main screen and the current AR mode on one region of the transparent display 110 as an auxiliary screen in accordance with a mode switching event.

By switching over to the other AR mode (S1930), the transparent display device 100 may make a screen according to the other AR mode and a screen according to the current AR mode overlap each other to be displayed.

By switching over to the other AR mode (S1930), the transparent display device 100 may divide a screen into first and second screens to display the other AR mode on the first divided screen and the current AR mode on the second divided screen, in accordance with a mode switching event.

The transparent display device 100 may further include a guider provided on a surface of the transparent display 110, and display a guide GUI having a shape that can be mapped on the guider so that a user's viewpoint coincides with an image capturing viewpoint of the camera.

The transparent display device 100 may also display an image captured by the camera 120 on the transparent display 110 in the form of an edge image so that an image that is penetratingly seen by a user through the transparent display 110 coincides with the image captured by the camera.

As described above, according to various exemplary embodiments, the AR mode that is appropriate to the use environment can be automatically provided to improve user convenience.

The methods according to the above various exemplary embodiments may be programmed and stored in various kinds of storage media. Accordingly, the methods according to the above various embodiments may be implemented in various types of electronic devices that execute the storage media.

Specifically, according to an exemplary embodiment, a non-transitory computer readable medium, which stores a program that executes a method including operating in one mode of the transparent AR mode in which an AR object is displayed on the transparent display 110 and the video AR mode in which an AR object is displayed on an image captured by the camera 120, and switching between the two AR modes if a predetermined event occurs.

The non-transitory computer readable medium is not a medium that stores data for a short period, such as a register, a cache, or a memory, but means a medium which semi-permanently stores data and is readable by a device. Specifically, the above-described programs may be stored and provided in the non-transitory computer readable medium, such as, a compact disc (CD), a digital versatile disc (DVD), a hard disc, a Blu-ray disc, a universal serial bus (USB), a memory card, and a ROM.

While the inventive concept has been shown and described with reference to certain exemplary embodiments thereof, it will be understood by those skilled in the art that various changes in form and detail may be made therein without departing from the spirit and scope the inventive concept, as defined by the appended claims.

What is claimed is:

1. A transparent display device comprising:
a transparent display;
a camera;

a graphic processor configured to obtain an augmented reality (AR) object; and a controller configured to operate in one of a transparent AR mode and a video AR mode, and to switch to the other one of the transparent AR mode and the video AR mode in response to an occurrence of a predetermined event, wherein the controller controls the transparent display to display the AR object related to an object in a state in which the object is transparently viewed through the transparent display in the transparent AR mode, and wherein the controller controls the transparent display to display the AR object related to an object included in an image captured by the camera on the captured image in the video AR mode.

2. The transparent display device as claimed in claim 1, further comprising a sensor configured to sense a distance between the transparent display device and the object, wherein the controller is further configured to switch from one of the transparent AR mode and the video AR mode to the other AR mode in response to an occurrence of an event in which the distance sensed by the sensor satisfies a predetermined condition.

3. The transparent display device as claimed in claim 1, further comprising a sensor configured to sense background information about the transparent display device, wherein the controller is further configured to switch from one of the transparent AR mode and the video AR mode to the other AR mode in response to an occurrence of an event in which at least one of illumination information and viewing environment information sensed by the sensor satisfies a predetermined condition.

4. The transparent display device as claimed in claim 1, further comprising a sensor configured to sense a battery residual amount of the transparent display device, wherein the controller is further configured to switch from one of the transparent AR mode and the video AR mode to the other AR mode in response to an occurrence of an event in which the battery residual amount sensed by the sensor satisfies a predetermined condition.

5. The transparent display device as claimed in claim 1, wherein the controller is further configured to control the transparent display to display a screen of the video AR mode by gradually reducing transparency of the transparent display in response to a mode switching event which occurs while the controller operates in the transparent AR mode.

6. The transparent display device as claimed in claim 1, wherein the controller is further configured to control the transparent display to display an AR mode to be switched as a main screen and a current AR mode on one region of the transparent display as an auxiliary screen in accordance with a mode switching event.

7. The transparent display device as claimed in claim 1, wherein the controller is further configured to control the transparent display to make a screen of an AR mode to be switched and a screen of a current AR mode overlap each other to be displayed.

8. The transparent display device as claimed in claim 1, wherein the controller is further configured to control the transparent display to divide a screen into first and second screens, to display a screen of an AR mode to be switched on the first screen and a screen of a current AR mode on the second screen in accordance with a mode switching event.

9. The transparent display device as claimed in claim 1, further comprising a gaze recognizer configured to recognize a user's gaze, wherein the controller is configured to control the transparent display to display the AR object on a region that has a little probability of escaping from the user's gaze on the basis of the recognized user's gaze.

10. The transparent display device as claimed in claim 1, further comprising a guider provided on the transparent display, wherein the controller is configured to control the transparent display to display a guide graphic user interface (GUI) of a shape that is mapped on the guider so that a user's viewpoint coincides with an image capturing viewpoint of the camera.

11. The transparent display device as claimed in claim 1, wherein the controller is further configured to control the transparent display to display the image captured by the camera on the transparent display in the form of an edge image so that an image that is penetratingly seen by a user through the transparent display coincides with the image captured by the camera.

12. A method for controlling a transparent display device comprising a transparent display and a camera, the method comprising:

controlling the device to operate in one of a transparent augmented reality (AR) mode and a video AR mode; and controlling the device to switch to the other one of the transparent AR mode and the video AR mode in response to an occurrence of a predetermined event, to display the AR object related to an object in a state in which the object is transparently viewed through the transparent display in the transparent AR mode, and to display the AR object related to an object included in an image captured by the camera on the captured image in the video AR mode.

13. The method as claimed in claim 12, further comprising controlling the device to sense a distance between the transparent display device and the object, wherein the controlling the device to switch comprises controlling the device to switch from one of the transparent AR mode and the video AR mode to the other AR mode in response to an occurrence of an event in which the sensed distance satisfies a predetermined condition.

14. The method as claimed in claim 12, further comprising controlling the device to sense at least one of illumination information and viewing environment information, wherein the controlling the device to switch comprises controlling the device to switch from one of the transparent AR mode and the video AR mode to the other AR mode in response to an occurrence of an event in which at least one of the sensed illumination information and the sensed viewing environment information satisfies a predetermined condition.

15. The method as claimed in claim 12, further comprising controlling the device to sense a battery residual amount of the device, wherein the controlling the device to switch comprises controlling the device to switch from one of the transparent AR mode and the video AR mode to the other AR mode in response to an occurrence of an event in which the sensed battery residual amount satisfies a predetermined condition.

16. The method as claimed in claim 12, wherein the controlling the device to switch comprises controlling the transparent display to display a screen according to the video AR mode by gradually reducing transparency of the transparent display in response to a mode switching event which occurs during an operation in the transparent AR mode.

17. The method as claimed in claim 12, wherein the controlling the device to switch comprises controlling the transparent display to display an AR mode to be switched as a main screen and a current AR mode on one region of the transparent display as an auxiliary screen, or to divide a screen into first and second screens, to display the AR mode to be switched on the first screen, and to display the current AR mode on the second screen, in accordance with a mode switching event.

18. The method as claimed in claim 12, wherein the controlling the device to switch comprises controlling the transparent display to make a screen according to an AR mode to be switched and a screen according to a current AR mode overlap each other to be displayed.

19. The method as claimed in claim 12, wherein the transparent display device further includes a guider provided on the transparent display, and wherein the method further comprises displaying a guide graphic user interface (GUI) of a shape that is mapped on the guider so that a user's viewpoint coincides with an image capturing viewpoint of the camera.

20. The method as claimed in claim 12, further comprising controlling the transparent display to display the image captured by the camera on the transparent display in the form of an edge image so that an image that is penetratingly seen by a user through the transparent display coincides with the image captured by the camera.

* * * * *